US 7,266,295 B2

(12) United States Patent
Ovadia et al.

(10) Patent No.: US 7,266,295 B2
(45) Date of Patent: *Sep. 4, 2007

(54) MODULAR RECONFIGURABLE MULTI-SERVER SYSTEM AND METHOD FOR HIGH-SPEED NETWORKING WITHIN PHOTONIC BURST-SWITCHED NETWORK

(75) Inventors: Shiomo Ovadia, San Jose, CA (US); Mario Paniccia, Santa Clara, CA (US); Kirk R. Hayden, El Dorado Hills, CA (US)

(73) Assignee: Intel Corporation, Santa Clara, CA (US)

( * ) Notice: Subject to any disclaimer, the term of this patent is extended or adjusted under 35 U.S.C. 154(b) by 897 days.

This patent is subject to a terminal disclaimer.

(21) Appl. No.: 10/418,487

(22) Filed: Apr. 17, 2003

(65) Prior Publication Data

US 2004/0208172 A1 Oct. 21, 2004

(51) Int. Cl.
*H04J 14/00* (2006.01)

(52) U.S. Cl. .............................. 398/51; 398/45; 398/46; 398/47; 398/48; 398/49; 398/50; 398/52; 398/53; 398/54; 398/55; 398/56; 398/57; 398/58; 398/59; 398/79; 398/83; 398/164; 370/217; 370/218; 370/222; 370/223; 370/360; 370/389; 370/489; 370/468; 370/466; 370/474; 370/395.2

(58) Field of Classification Search .................. 398/45, 398/48, 49, 50, 51, 53, 83, 54, 79, 55, 56, 398/164, 46, 47, 52, 57, 88, 59; 370/419, 370/217, 360, 218, 395.2, 222, 223, 468, 370/474, 466, 389
See application file for complete search history.

(56) References Cited

U.S. PATENT DOCUMENTS 5,235,592 A 8/1993 Cheng et al.

(Continued)

FOREIGN PATENT DOCUMENTS

CN 1384618 12/2002

(Continued)

OTHER PUBLICATIONS

Mike J. O'Mahony, et al., "The Application of Optical Packet Switching in Future Communication Networks", *IEEE Communication Magazine*, Mar. 2001.

(Continued)

*Primary Examiner*—Hanh Phan
(74) *Attorney, Agent, or Firm*—Blakely, Sokoloff, Taylor & Zafman LLP

(57) ABSTRACT

A modular reconfigurable multi-server system with hybrid optical and electrical switching fabrics for high-speed networking within a wavelength-division-multiplexed based photonic burst-switched (PBS) network with variable time slot provisioning. An optical high-speed I/O module within the multi-server system includes an optical switch with the control interface unit. A server module of the multi-server system statistically multiplexes IP packets and/or Ethernet frames to be transmitted over the PBS network, generate control and data bursts and schedule their transmission. Then, the server E-O converts the bursts, and then transmits the optical bursts to the optical I/O module. The optical I/O module then optically transmits the bursts to the next hop in the optical path after processing the optical control burst to configure the optical switch, which then optically switches the optical data burst without performing an O-E-O conversion.

72 Claims, 13 Drawing Sheets

U.S. PATENT DOCUMENTS

| | | | |
|---|---|---|---|
| 5,331,642 A | 7/1994 | Valley et al. | |
| 5,550,803 A | 8/1996 | Crayford et al. | |
| 5,559,796 A | 9/1996 | Edem et al. | |
| 5,646,943 A | 7/1997 | Elwalid | |
| 5,768,274 A | 6/1998 | Murakami et al. | |
| 5,838,663 A | 11/1998 | Elwalid et al. | |
| 5,970,050 A | 10/1999 | Johnson | |
| 5,978,356 A | 11/1999 | Elwalid et al. | |
| 6,111,673 A | 8/2000 | Chang et al. | |
| 6,222,839 B1 | 4/2001 | Nakazaki et al. | |
| 6,260,155 B1 | 7/2001 | Dellacona | |
| 6,272,117 B1 | 8/2001 | Choi et al. | |
| 6,325,636 B1 | 12/2001 | Hipp et al. | |
| 6,339,488 B1 | 1/2002 | Beshai et al. | |
| 6,400,863 B1 | 6/2002 | Weinstock et al. | |
| 6,411,506 B1 | 6/2002 | Hipp et al. | |
| 6,466,586 B1 | 10/2002 | Darveau et al. | |
| 6,487,686 B1 | 11/2002 | Yamazaki et al. | |
| 6,490,292 B1 | 12/2002 | Matsuzawa | |
| 6,498,667 B1 | 12/2002 | Masucci et al. | |
| 6,519,062 B1 | 2/2003 | Yoo | |
| 6,519,255 B1 | 2/2003 | Graves | |
| 6,542,499 B1 | 4/2003 | Murphy et al. | |
| 6,615,382 B1 | 9/2003 | Kang et al. | |
| 6,671,256 B1 | 12/2003 | Xiong et al. | |
| 6,721,271 B1 | 4/2004 | Beshai et al. | |
| 6,721,315 B1 | 4/2004 | Xiong et al. | |
| 6,842,424 B1 | 1/2005 | Key et al. | |
| 6,873,797 B2 | 3/2005 | Chang et al. | |
| 6,898,205 B1 | 5/2005 | Chaskar et al. | |
| 6,925,257 B2 | 8/2005 | Yoo | |
| 6,940,863 B2 | 9/2005 | Xue et al. | |
| 6,956,868 B2 * | 10/2005 | Qiao | 370/466 |
| 6,987,770 B1 | 1/2006 | Yonge, III | |
| 6,990,071 B2 | 1/2006 | Adam et al. | |
| 7,023,846 B1 | 4/2006 | Andersson et al. | |
| 7,035,537 B2 | 4/2006 | Wang et al. | |
| 7,106,968 B2 | 9/2006 | Lahav et al. | |
| 2002/0018263 A1 | 2/2002 | Ge et al. | |
| 2002/0018468 A1 | 2/2002 | Nishihara | |
| 2002/0023249 A1 | 2/2002 | Temullo et al. | |
| 2002/0027686 A1 | 3/2002 | Wada et al. | |
| 2002/0063924 A1 | 5/2002 | Kimbrough et al. | |
| 2002/0109878 A1 | 8/2002 | Qiao | |
| 2002/0126337 A1 | 9/2002 | Uematsu et al. | |
| 2002/0141400 A1 | 10/2002 | DeMartino | |
| 2002/0150099 A1 | 10/2002 | Pung et al. | |
| 2002/0154360 A1 | 10/2002 | Liu | |
| 2002/0186433 A1 | 12/2002 | Mishra | |
| 2002/0186695 A1 | 12/2002 | Schwartz et al. | |
| 2002/0196808 A1 | 12/2002 | Karri et al. | |
| 2003/0002499 A1 | 1/2003 | Cummings et al. | |
| 2003/0009582 A1 | 1/2003 | Qiao et al. | |
| 2003/0016411 A1 | 1/2003 | Zhou et al. | |
| 2003/0031198 A1 | 2/2003 | Currivan et al. | |
| 2003/0037297 A1 | 2/2003 | Araki | |
| 2003/0039007 A1 | 2/2003 | Ramadas et al. | |
| 2003/0053475 A1 | 3/2003 | Veeraraghavan ert al. | |
| 2003/0099243 A1 | 5/2003 | Oh et al. | |
| 2003/0120799 A1 | 6/2003 | Lahav et al. | |
| 2003/0189933 A1 | 10/2003 | Ozugur et al. | |
| 2003/0214979 A1 | 11/2003 | Kang et al. | |
| 2004/0004966 A1 | 1/2004 | Foster et al. | |
| 2004/0062263 A1 | 4/2004 | Charcranoon et al. | |
| 2004/0131061 A1 | 7/2004 | Matsuoka et al. | |
| 2004/0156325 A1 | 8/2004 | Perkins et al. | |
| 2004/0156390 A1 | 8/2004 | Prasad et al. | |
| 2004/0208171 A1 * | 10/2004 | Ovadia et al. | 370/360 |
| 2004/0208554 A1 | 10/2004 | Wakai et al. | |
| 2005/0068995 A1 | 3/2005 | Lahav et al. | |
| 2005/0152349 A1 | 7/2005 | Takeuchi et al. | |
| 2005/0259571 A1 | 11/2005 | Battou | |
| 2006/0008273 A1 | 1/2006 | Xue et al. | |

FOREIGN PATENT DOCUMENTS

| | | |
|---|---|---|
| CN | 1406000 | 3/2003 |
| CN | 1426189 | 6/2003 |
| EP | 0876076 A | 11/1998 |
| EP | 1 073 306 A2 | 1/2001 |
| EP | 1073307 A | 1/2001 |
| EP | 1089498 A | 4/2001 |
| EP | 1122971 A | 8/2001 |
| EP | 1135000 A | 9/2001 |
| EP | 1217862 A | 6/2002 |
| EP | 1303111 A | 4/2003 |
| EP | 1351458 A | 10/2003 |
| WO | WO 01/19006 A | 3/2001 |
| WO | WO 01/67694 A | 9/2001 |
| WO | WO 01/76160 A | 10/2001 |
| WO | WO 01/86998 A1 | 11/2001 |
| WO | WO 02/41663 A | 5/2002 |
| WO | WO 02/067505 A | 8/2002 |
| WO | PCT/US2004/007804 | 10/2004 |

OTHER PUBLICATIONS

Shun Yao, et al., "All-Optical Packet Switching for Metropolitan Area Networks: Opportunities and Challenges", *IEEE Communications Magazine*, Mar. 2001.

Dr. Chunming Qiao, et al., "Optical Burst Switching", *Business Briefing: Global Photonics Applications and Technology*, 2000.

Chunming Qiao, "Labeled Optical Burst Switching for IP-over-WDM Integration", *IEEE Communications Magazine*, Sep. 2000.

A. Carena, et al., "OPERA: An Optical Packet Experimental Routing Architecture with Label Swapping Capability", *Journal of Lightwave Technology*, vol. 16, No. 12, Dec. 1998.

Wen De Zhong, "A New Wavelength-Routed Photonic Packet Buffer Combing Traveling Delay Lines with Delay-Line Loops", *Journal of Lightwave Technology*, vol. 19, No. 8, Aug. 2001.

D. Wiesmann et al., "Apodized Surface-Corrugated Gratings with Varying Duty Cycles", *IEEE Photonics Technology Letter*, vol. 12, No. 6, Jun. 2000.

Kenneth O. Hill, et al., "Fiber Gragg Grating Technology Fundamentals and Overview", *Journal of Lightwave Technology*, vol. 15, No. 8, Aug. 1997.

Turan Erdogan, "Fiber Grating Spectra", *Journal of Lightwave Technology*, vol. 15, No. 8, Aug. 1997.

K. Sugden et al., "Fabrication and Characterization of Bandpass Filters Based on Concatenated Chirped Faber Gratings", *Journal of Lightwave Technology*, vol. 15, No. 8, Aug. 1997.

C. R. Giles, "Lightwave Application of Fiber Bragg Gratings", *Journal of Lightwave Technology*, vol. 15, No. 8, Aug. 1997.

A. E. Willner, et al., "Tunable Compensation of Channel Degrading Effects Using Nonlinearly Chirped Passive Fiber Bragg Gratings", *IEEE Journal of Selected Topics in Quantum Electronics*, vol. 5, No. 5, Sep./Oct. 1999.

P.V. Studenkov, et al., "Asymmetric Twin-Waveguide 1.55 μm Wavelength Laser with a Distributed Bragg Reflector", *IEEE Photonic Technology Letters*, vol. 12, No. 5, May 2000.

Yasuo Shibata et al., "Coupling Coeffiecient Modulation of Waveguide Grating Using Sampled Grating", *IEEE Photonics Technology Letters*, vol. 6, No. 10, Oct. 1994.

Greg Bernstein et al., "OIF UNI 1.0—Controlling Optical Networks", info@oiforum.com, Jun. 2001.

(Abstract), "MPLS Technologies for IP Networking Solution", pp. 1-5, 2000.

Rick Gallaher, "An Introduction to MPLS", *Course Director for Global Knowledge and President of Telecommunications Technical Services, Inc.*, Sep. 10, 2001.

"Compare SANs to Alternate Technologies", *Brocade*, http://www.brocade.com/san/evaluate/compare_san.jsp. p. 1 of 4, Feb. 26, 2003.

Ravi Kumar Khattar, et, "Introduction to Storage Area Network, SAN", *International Technical Support Organization*, www.redbooks.ibm.com, Aug. 1999.

Chaskar, H. et al., "Robust Transport of IP Traffic Over WDM Using Optical Burst Switching," Optical Networks Magazine, Jul./Aug. 2002, pp. 47-60.

Oh, Se-Yoon et al., "A Data Burst Assembly Algorithm in Optical Burst Switching Networks," ETRI Journal, vol. 24, No. 4, Aug. 2002, pp. 311-322, Electronics and Telecommunications Research Institute, Tejon, Korea.

IETF Networking Group RFC Standards Track, "Generalized Multi-Protocol Label Switching (GMPLS) Signaling Functional Description," Jan. 2003. Retrieved on Jul. 8, 2004 from http://www.ietf.org/rfc/rfc3471.txt.

Liu, Hang et al., "GMPLS-Based Control Plane for Optical Networks: Early Implementation Experience," Proceedings of the SPIE, vol. 4872, Jul. 29, 2002, pp. 220-229, SPIE, Bellingham, VA, US.

Sahara, A. et al., "Demonstration of Optical Burst Data Switching Using Photonic MPLS Routers Operated by GMPLS Signaling," OFC 2003, vol. 1, pp. 220-222.

Qiao, C. et al., "Polymorphic Control for Cost-Effective Design of Optical Networks", European Transactions on Telecommunications, vol. 11, No. 1, Jan.-Feb. 2000, pp. 17-26.

Baldine, I. et al., "Jumpstart: A Just-in-Time Signaling Architecture for WDM Burst-Switched Networks", IEEE Communications Magazine, Feb. 2002, pp. 82-89.

Comellas, J. et al., "Integrated IP/WDM Routing in GMPLS-Based Optical Networks", IEEE Network, Mar./Apr. 2003, pp. 22-27.

Cidon, I. et al., "Connection Establishment in High-Speed Networks", IEEE/ACM Transactions on Networking, No. 4, Aug. 1993, pp. 469-481.

"Generalized Multiprotocol Label Switching (GMPLS)", Copyright © The International Engineering Consortium, Web ProForum Tutorials http://www.iec.org, pp. 1-27, 2007.

Floyd, Sally et al., "Modifying TCP's Congestion Control for High Speeds," May 5, 2002, pp. 1-5.

Fredj, S. Ben et al., "Statistical Bandwidth Sharing: A Study of Congestion at Flow Level", France Telecom R&D, pp. 111-122, Aug. 27, 2001.

Zeljkovic, Nada et al., "A Simulation Analysis of Statistical Multiplexing in Frame Relay and ATM Internetworking", TELESIKS 2001, Sep. 19-21, 2001, Nis, Yugoslavia, pp. 116-119.

Kumaran, Krishnan et al., "Multiplexing Regulated Traffic Streams: Design and Performance", Bell Laboratories/Lucent Technologies, IEEE INFOCOM 2001, pp. 527-536.

Su, C. -F. et al., "On Statistical Multiplexing, Traffic Mixes, and VP Management", University of Texas at Austin, 1998 IEEE.

Brown, Timothy X., "Adaptive Statistical Multiplexing for Broadband Communication", Performance Evaluation and Application of ATM Networks, Kouvatsos, D. editor, Kluwer, 2000, pp. 51-80.

Walch, Philip F., "FEC Standards and Long Haul STM-64 DWDM Transmission," Contribution to T1 Standards Project T1X1.5, Jan. 17-20, 2000, pp. 1-4.

"ITU-T Rec. G.709/Y.1331—Interfaces for the Optical Transport Network (OTN)", International Telecommunication Union, Mar. 2003, pp. 1-109.

Henderson, Michael, "Forward Error Correction in Optical Network," Mar. 27, 2001. http://members.cox.net/michaeo.henderson/Papers/Optical_FEC.pdf, pp. 1-18.

Wei, Wei et al., "GMPLS-Based Hierarchical Optical Routing Switching Architecture", Proceedings of SPIE, vol. 4585, 2001, pp. 328-334.

Banerjee, A. et al., "Generalized Multiprotocol Label Switching: An Overview of Routing and Management Enhancements," IEEE Communications Magazine, Jan. 2001, pp. 144-150.

Kim, Y. et al., "Discrete Event Simulation of the DiffServ-over-MPLS with NIST GMPLS Lightwave Agile Switching Simulator (GLASS)," Joint Conference of Communication and Information -2002, Jeju, Korea, 4 pgs.

Cao, Xiaojun et al., "Assembling TCP/IP Packets in Optical Burst Switched Networks", IEEE Global Telecommunications Conference, 2002, pp. 2808-2812, vol. 1, New York.

Wang, S.Y., "Using TCP Congestion Control to Improve the Performance of Optical Burst Switched Networks", IEEE International Conference on Communications, 2003, pp. 1438-1442, Taiwan.

Detti, Andrea et al., "Impact of Segments Aggregation on TCP Reno Flows in Optical Burst Switching Networks", IEEE Infocom, 2002, pp. 1803-1805, vol. 1, New York.

Ghani, Nasir et al., "On IP-over-WDM Integration", IEEE Communications Magazine, Mar. 2000, pp. 72-84.

Yoo, S.J. Ben, "Optical-label switching, MPLS, MPLambdaS, and GMPLS", Optical Networks Magazine, May/Jun. 2003, pp. 17-31.

Rekhter, Y. et al., "A Border Gateway Protocol 4 (BGP-4)", Network Working Group, Mar. 1995, pp. 1-57.

Final Office Action mailed on Oct. 26, 2006. Maciocco et al., "Method and System to Frame and Format Optical Control and Data Bursts in WDM-Based Photonic Burst Switched Networks", U.S. Appl. No. 10/377,580, filed Feb. 28, 2003.

Office Action mailed on Oct. 18, 2006. Ovadia et al., "Architecture and Method for Framing Control and Data Bursts Over 10 Gbit Ethernet With and Without WAN Interface Sublayer Support", U.S. Appl. No. 10/459,781, filed Jun. 11, 2003.

Office Action mailed on Nov. 14, 2006. Ovadia et al., "Dynamic Route Discovery for Optical Switched Networks," U.S. Appl. No. 10/691,712, filed Oct. 22, 2003.

Office Action mailed on Nov. 15, 2006. Ovadia et al., "Architecture and Method for Framing Optical Control and Data Bursts Within Optical Transport Unit Structures in Photonic Burst-Switched Networks", U.S. Appl. No. 10/441,771, filed May 19, 2003.

Final Office Action mailed on Nov. 22, 2006. Maciocco et al., "Adaptive Framework for Closed-Loop Protocols Over Photonic Burst Switched Networks", U.S. Appl. No. 10/464,969, filed Jun. 18, 2003.

Office Action mailed on Nov. 29, 2006. Ovadia et al., "Architecture, Method and System of Multiple High-Speed Servers to Network in WDM Based Photonic Burst-Switched Networks," U.S. Appl. No. 10/417,823, filed Apr. 16, 2003.

Office Action mailed on Jan. 3, 2007. Ovadia et al., "Method and System to Recover Resources in the Event of Data Burst Loss Within WDM-Based Optical-Switched Networks," U.S. Appl. No. 10/668,874, filed Sep. 23, 2003.

Office Action mailed on Jan. 10, 2007. Maciocco et al., "Reservation Protocol Signaling Extensions for Optical Switched Networks", U.S. Appl. No. 10/636,062, filed Aug. 6, 2003.

Final Office Action mailed on Jan. 17, 2007. Maciocco et al., "Generic Multi-Protocol Label Switching (GMPLS)-Based Label Space Architecture for Optical Switched Networks", U.S. Appl. No. 10/606,323, filed Jun. 24, 2003.

Final Office Action mailed on Feb. 9, 2007. Maciocco et al., "Architecture, Method and System of WDM-Based Photonic Burst Switched Networks," U.S. Appl. No. 10/377,312, filed Feb. 28, 2003.

Office Action mailed on Feb. 20, 2007. Maciocco et al., "Method and System to Frame and Format Optical Control and Data Bursts in WDM-Based Photonic Burst Switched Networks," U.S. Appl. No. 10/377,580, filed Feb. 28, 2003.

* cited by examiner

OPTICAL DATA BURST FORMAT

OPTICAL CONTROL BURST FORMAT

MODULAR RECONFIGURABLE MULTI-SERVER SYSTEM AND METHOD FOR HIGH-SPEED NETWORKING WITHIN PHOTONIC BURST-SWITCHED NETWORK

CROSS REFERENCE TO RELATED APPLICATIONS

The present application is related to U.S. patent application Ser. No. 10/126,091, filed Apr. 17, 2002, now U.S. Pat. No. 7,181,140; U.S. patent applicaton Ser. No. 10/183,111, filed Jun. 25, 2002, and U.S. patent applicaton Ser. No. 10/328,571, filed Dec. 24, 2002, U.S. patent applicaton Ser. No. 10/377,312 filed Feb. 28, 2003, U.S. patent applicaton Ser. No. 10/377,580 filed Feb. 28, 2003, and U.S. patent applicaton Ser. No. 10/417,823 filed Apr. 16, 2003.

FIELD OF THE INVENTION

An embodiment of the present invention relates to optical networks in general; and, more specifically, to high-speed networking of multiple servers within photonic burst-switched networks.

BACKGROUND INFORMATION

Transmission bandwidth demands in telecommunication networks (e.g., the Internet) appear to be ever increasing and solutions are being sought to support this bandwidth demand. One solution to this problem is to use fiber-optic networks, where wavelength-division-multiplexing (WDM) technology is used to support the ever-growing demand in optical networks for higher data rates.

Conventional optical switched networks typically use wavelength routing techniques, which require that optical-electrical-optical (O-E-O) conversion of optical signals be done at the optical switches. O-E-O conversion at each switching node in the optical network is not only very slow operation (typically about ten milliseconds), but it is very costly, and potentially creates a traffic bottleneck for the optical switched network. In addition, the current optical switch technologies cannot efficiently support "bursty" traffic that is often experienced in packet communication applications (e.g., the Internet).

A large communication network can be implemented using several sub-networks. For example, a large network to support Internet traffic can be divided into a large number of relatively small access networks operated by Internet service providers (ISPs), which are coupled to a number of metropolitan area networks (Optical MANs), which are in turn coupled to a large "backbone" wide area network (WAN). The optical MANs and WANs typically require a higher bandwidth than local-area networks (LANs) in order to provide an adequate level of service demanded by their high-end users. However, as LAN speeds/bandwidth increase with improved technology, there is a need for increasing MAN/WAN speeds/bandwidth.

BRIEF DESCRIPTION OF THE DRAWINGS

Non-limiting and non-exhaustive embodiments of the present invention are described with reference to the following figures, wherein like reference numerals refer to like parts throughout the various views unless otherwise specified.

DETAILED DESCRIPTION OF PREFERRED EMBODIMENTS

Figure 1:
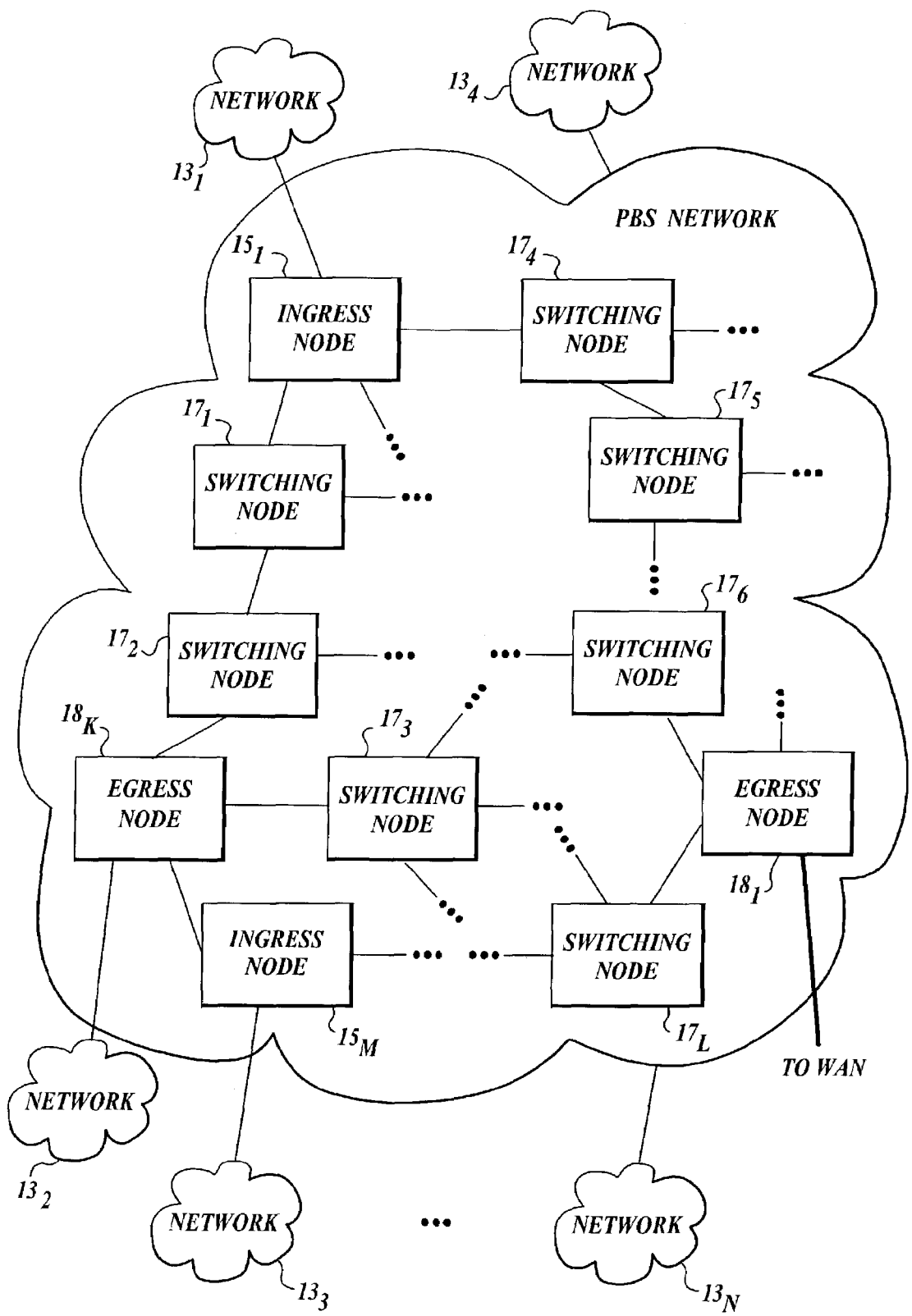
FIG. 1 is a simplified block diagram illustrating a photonic burst-switched (PBS) network with variable time slot provisioning, according to one embodiment of the present invention.

FIG. 1 illustrates a photonic burst-switched (PBS) network 10, according to one embodiment of the present invention. The term photonic burst is used herein to refer to statistically-multiplexed packets (e.g., Internet protocol (IP) packets or Ethernet frames) having similar routing requirements). A photonic burst typically includes a photonic label including the header and other routing information of the IP packets and a payload including the data segments of the packets.

This embodiment of PBS network 10 includes local area networks (LANs) $13_1$-$13_N$ and a backbone optical WAN (not shown). In addition, this embodiment of PBS network 10 includes ingress nodes $15_1$-$15_M$, switching nodes $17_1$-$17_L$, and egress nodes $18_1$-$18_K$. PBS network 10 can include other ingress, egress and switching nodes (not shown) that are interconnected with the switching nodes shown in FIG. 1. The ingress and egress nodes are also referred to herein as edge nodes in that they logically reside at the edge of the PBS network. The edge nodes, in effect, provide an interface between the aforementioned "external" networks (i.e., external to the PBS network) and the switching nodes of the PBS network. In this embodiment, the ingress, egress and switching nodes are implemented with intelligent modules. This embodiment can be used, for example, as a metropolitan area network connecting a large number of LANs within the metropolitan area to a large optical backbone network.

In some embodiments, the ingress nodes perform optical-electrical (O-E) conversion of received optical signals, and include electronic memory to buffer the received signals until they are sent to the appropriate LAN. In addition, in some embodiments, the ingress nodes also perform electrical-optical (E-O) conversion of the received electrical signals before they are transmitted to switching nodes $17_1$-$17_M$ of PBS network 10.

Egress nodes are implemented with optical switching units or modules that are configured to receive optical signals from other nodes of PBS network 10 and route them to the optical WAN or other external networks. Egress nodes can also receive optical signals from the optical WAN or other external network and send them to the appropriate node of PBS network 10. In one embodiment, egress node $18_1$ performs O-E-O conversion of received optical signals, and includes electronic memory to buffer received signals until they are sent to the appropriate node of PBS network 10 (or to the optical WAN).

Switching nodes $17_1$-$17_L$ are implemented with optical switching units or modules that are each configured to receive optical signals from other switching nodes and appropriately route the received optical signals to other switching nodes of PBS network 10. As is described below, the switching nodes perform O-E-O conversion of optical control bursts and network management control burst signals. In some embodiments, these optical control bursts and network management control bursts are propagated only on preselected wavelengths. The preselected wavelengths do not propagate optical "data" bursts (as opposed to control bursts and network management control bursts) signals in such embodiments, even though the control bursts and network management control bursts may include necessary information for a particular group of optical data burst signals. The control and data information is transmitted on separate wavelengths in some embodiments (also referred to herein as out-of-band signaling). In other embodiments, control and data information may be sent on the same wavelengths (also referred to herein as in-band signaling). In another embodiment, optical control bursts, network management control bursts, and optical data burst signals may be propagated on the same wavelength(s) using different encoding schemes such as different modulation formats, etc. In either approach, the optical control bursts and network management control bursts are sent asynchronously relative to its corresponding optical data burst signals. In still another embodiment, the optical control bursts and other control signals are propagated at different transmission rates as the optical data signals.

Although switching nodes $17_1$-$17_L$ may perform O-E-O conversion of the optical control signals, in this embodiment, the switching nodes do not perform O-E-O conversion of the optical data burst signals. Rather, switching nodes $17_1$-$17_L$ perform purely optical switching of the optical data burst signals. Thus, the switching nodes can include electronic circuitry to store and process the incoming optical control bursts and network management control bursts that were converted to an electronic form and use this information to configure photonic burst switch settings, and to properly route the optical data burst signals corresponding to the optical control bursts. The new control bursts, which replace the previous control bursts based on the new routing information, are converted to an optical control signal, and it is transmitted to the next switching or egress nodes. Embodiments of the switching nodes are described further below.

Elements of exemplary PBS network 10 are interconnected as follows. LANs $13_1$-$13_N$ are connected to corresponding ones of ingress nodes $15_1$-$15_M$. Within PBS network 10, ingress nodes $15_1$-$15_M$ and egress nodes $18_1$-$18_K$ are connected to some of switching nodes $17_1$-$17_L$ via optical fibers. Switching nodes $17_1$-$17_L$ are also interconnected to each other via optical fibers in mesh architecture to form a relatively large number of lightpaths or optical links between the ingress nodes, and between ingress nodes $15_1$-$15_L$ and egress nodes $18_1$-$18_K$. Ideally, there are more than one lightpath to connect the switching nodes $17_1$-$17_L$ to each of the endpoints of PBS network 10 (ie., the ingress nodes and egress nodes are endpoints within PBS network 10). Multiple lightpaths between switching nodes, ingress nodes, and egress nodes enable protection switching when one or more node fails, or can enable features such as primary and secondary route to destination.

As described below in conjunction with FIG. 2, the ingress, egress and switching nodes of PBS network 10 are configured to send and/or receive optical control bursts, optical data burst, and other control signals that are wavelength multiplexed so as to propagate the optical control bursts and control labels on pre-selected wavelength(s) and optical data burst or payloads on different preselected wavelength(s). Still further, the edge nodes of PBS network 10 can send optical control burst signals while sending data out of PBS network 10 (either optical or electrical).

Figure 2:
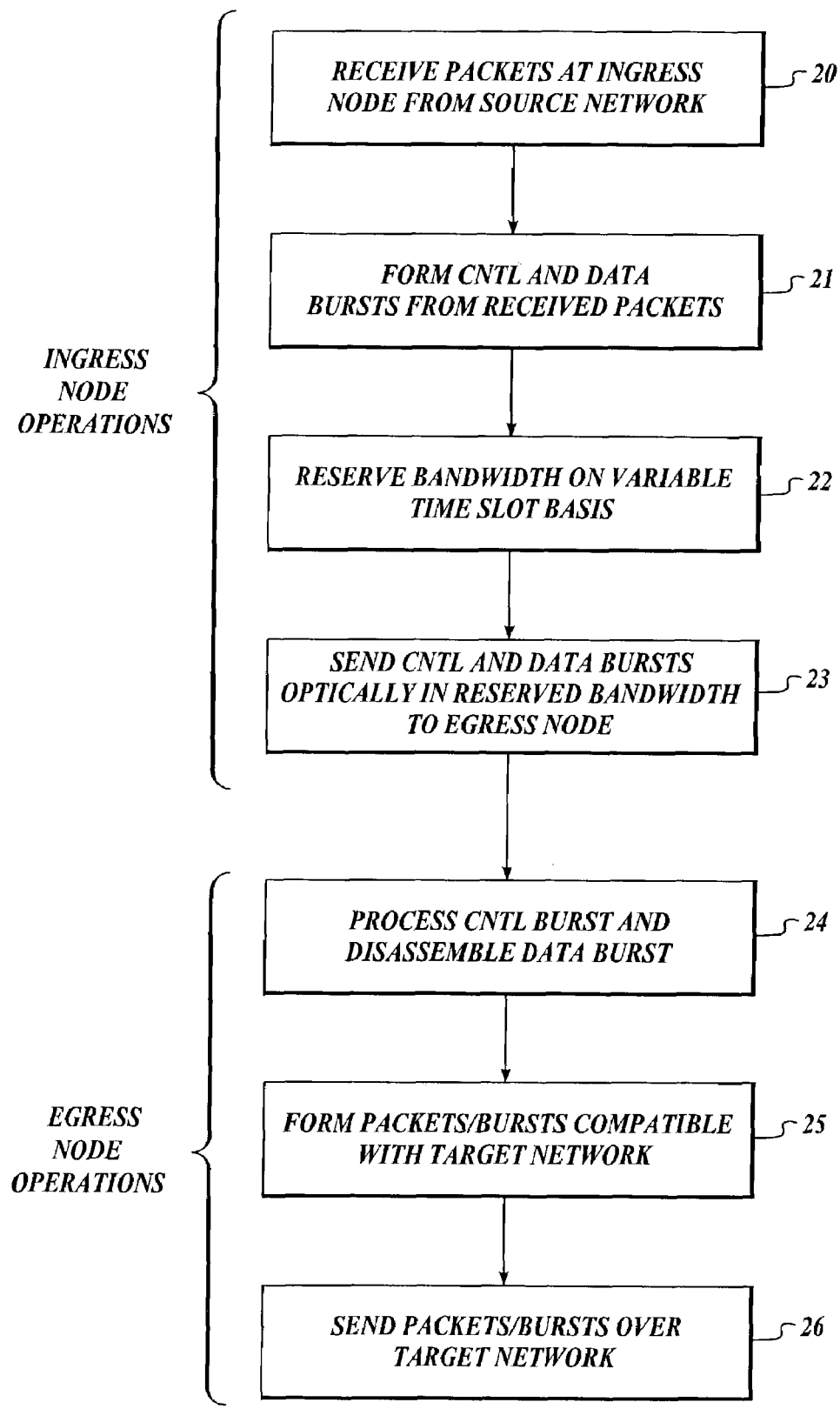
FIG. 2 is a simplified flow diagram illustrating the operation of a PBS network, according to one embodiment of the present invention.

FIG. 2 illustrates the operational flow of PBS network 10, according to one embodiment of the present invention. Referring to FIGS. 1 and 2, photonic burst switched network 10 operates as follows.

PBS network 10 receives packets from LANs $13_1$-$13_N$. In one embodiment, PBS network 10 receives IP packets at ingress nodes $15_1$-$15_M$. The received packets can be in electronic form rather than in optical form, or received in optical form and then converted to electronic form. In this embodiment, the ingress nodes store the received packets electronically. A block 20 represents this operation.

For clarity, the rest of the description of the operational flow of PBS network 10 focuses on the transport of information from ingress node $15_1$ to egress node $18_1$. The transport of information from ingress nodes $15_2$-$15_M$ to egress node $18_1$ (or other egress nodes) is substantially similar.

An optical burst label (i.e., an optical control burst) and optical payload (i.e., an optical data burst) is formed from the received packets. In one embodiment, ingress node $15_1$ uses statistical multiplexing techniques to form the optical data burst from the received IP (Internet Protocol) packets stored in ingress node $15_1$. For example, packets received by ingress node $15_1$ and having to pass through egress node $18_1$ on their paths to a destination can be assembled into an optical data burst payload. Statistical multiplexing generally refers to techniques for sharing a link or channel by multiple data sources based on statistics of the bandwidth used by the sources (e.g., an average) rather than the peak bandwidth required by each source. For example, statistical multiplexing techniques are disclosed by K. Kumaran and M. Mandjes, "Multiplexing Regulated Traffic Streams: Design and Performance" in Proc. of IEEE INFOCOM 2001; C.-F. Su and G. de Veciana, "On Statistical Multiplexing, Traffic Mixes, and VP Management" in Proc. of IEEE INFOCOM 1998; T. Brown, "Adaptive Statistical Multiplexing For Broadband Communication", Chapter 3, of "Performance Evaluation and Application of ATM Networks", Kouvatsos, D. editor, Kluwer, 2000. Other embodiments can use any suitable statistical multiplexing technique. A block 21 represents this operation.

Bandwidth on a specific optical channel and/or fiber is reserved to transport the optical data burst through PBS network 10. In one embodiment, ingress node $15_1$ reserves a time slot (i.e., a time slot of a TDM system) in an optical data signal path through PBS network 10. This time slot maybe fixed-time duration and/or variable-time duration with either uniform or non-uniform timing gaps between adjacent time slots. Further, in one embodiment, the bandwidth is reserved for a time period sufficient to transport the optical burst from the ingress node to the egress node. For example, in some embodiments, the ingress, egress, and switching nodes maintain an updated list of all used and available time slots. The time slots can be allocated and distributed over multiple wavelengths and optical fibers. Thus, a reserved time slot (also referred to herein as a TDM channel), that in different embodiments may be of fixed-duration or variable-duration, may be in one wavelength of one fiber, and/or can be spread across multiple wavelengths and multiple optical fibers. A block 22 represents this operation.

When an ingress and/or egress node reserves bandwidth or when bandwidth is released after an optical data burst is transported, a network controller (not shown) updates the list. In one embodiment, the network controller and the ingress or egress nodes perform this updating process using various burst or packet scheduling algorithms based on the available network resources and traffic patterns. The available variable-duration TDM channels, which are periodically broadcasted to all the ingress, switching, and egress nodes, are transmitted on the same wavelength as the optical control bursts or on a different common preselected wavelength throughout the optical network. The network controller function can reside in one of the ingress or egress nodes, or can be distributed across two or more ingress and/or egress nodes. In this embodiment, the network controller is part of control unit 37 (FIG. 3), which can include one or more processors.

The optical control bursts, network management control labels, and optical data bursts are then transported through photonic burst switched network 10 in the reserved time slot or TDM channel. In one embodiment, ingress node $15_1$ transmits the control burst to the next node along the optical label-switched path (OLSP) determined by the network controller. In this embodiment, the network controller uses a constraint-based routing protocol [e.g., generalized multi-protocol label switching (GMPLS) Draft Internet Engineering Task Force (IETF) Architecture-05 Internet Draft, March 2003] over one or more wavelengths to determine the best available OLSP to the egress node.

In one embodiment, the control label (also referred to herein as a control burst) is transmitted asynchronously ahead of the photonic data burst and on a different wavelength and/or different fiber. The time offset between the control burst and the data burst allows each of the switching nodes to process the label and configure the photonic burst switches to appropriately switch before the arrival of the corresponding data burst. The term photonic burst switch is used herein to refer to fast optical switches that do not use O-E-O conversion.

In one embodiment, ingress node $15_1$ then asynchronously transmits the optical data bursts to the switching nodes where the optical data bursts experience little or no time delay and no O-E-O conversion within each of the switching nodes. The optical control burst is always sent before the corresponding optical data burst is transmitted.

In some embodiments, the switching node may perform O-E-O conversion of the control bursts so that the node can extract and process the routing information included in the label. Further, in some embodiments, the TDM channel is propagated in the same wavelengths that are used for propagating labels. Alternatively, the labels and payloads can be modulated on the same wavelength in the same optical fiber using different modulation formats. For example, optical labels can be transmitted using non-return-to-zero (NRZ) modulation format, while optical payloads are transmitted using return-to-zero (RZ) modulation format. The optical burst is transmitted from one switching node to another switching node in a similar manner until the optical control and data bursts are terminated at egress node $18_1$. A block 23 represents this operation.

The operational flow at this point depends on whether the target network is an optical WAN or a LAN. A block 24 represents this branch in the operational flow.

If the target network is an optical WAN, new optical label and payload signals are formed. In this embodiment, egress node $18_1$ prepares the new optical label and payload signals. A block 25 represents this operation.

The new optical label and payload are then transmitted to the target network (i.e., WAN in this case). In this embodiment, egress node $18_1$ includes an optical interface to transmit the optical label and payload to the optical WAN. A block 26 represents this operation.

However, if in block 24 the target network is a LAN, the optical data burst is disassembled to extract the IP packets or Ethernet frames. In this embodiment, egress node $18_1$ converts the optical data burst to electronic signals that egress node $18_1$ can process to recover the data segment of each of the packets as represented in block 25.

The extracted IP data packets or Ethernet frames are processed, combined with the corresponding IP labels, and then routed to the target network (i.e., LAN in this case). In this embodiment, egress node $18_1$ forms these new IP packets. A block 28 represents this operation. The new IP packets are then transmitted to the target network (i.e., LAN) as represented in block 26.

PBS network 10 can achieve increased bandwidth efficiency through the additional flexibility afforded by the TDM channels. Although this exemplary embodiment described above includes an optical MAN having ingress, switching and egress nodes to couple multiple LANs to an optical WAN backbone, in other embodiments the networks do not have to be LANs, optical MANs or WAN backbones. That is, PBS network 10 may include a number of relatively small networks that are coupled to a relatively larger network that in turn is coupled to a backbone network.

Although a WDM embodiment is described above, in other embodiments, a single wavelength can be used for the entire PBS network. Some of these single wavelength alternative embodiments have multiple optical fibers interconnections between each node to provide increased bandwidth.

Figure 3:
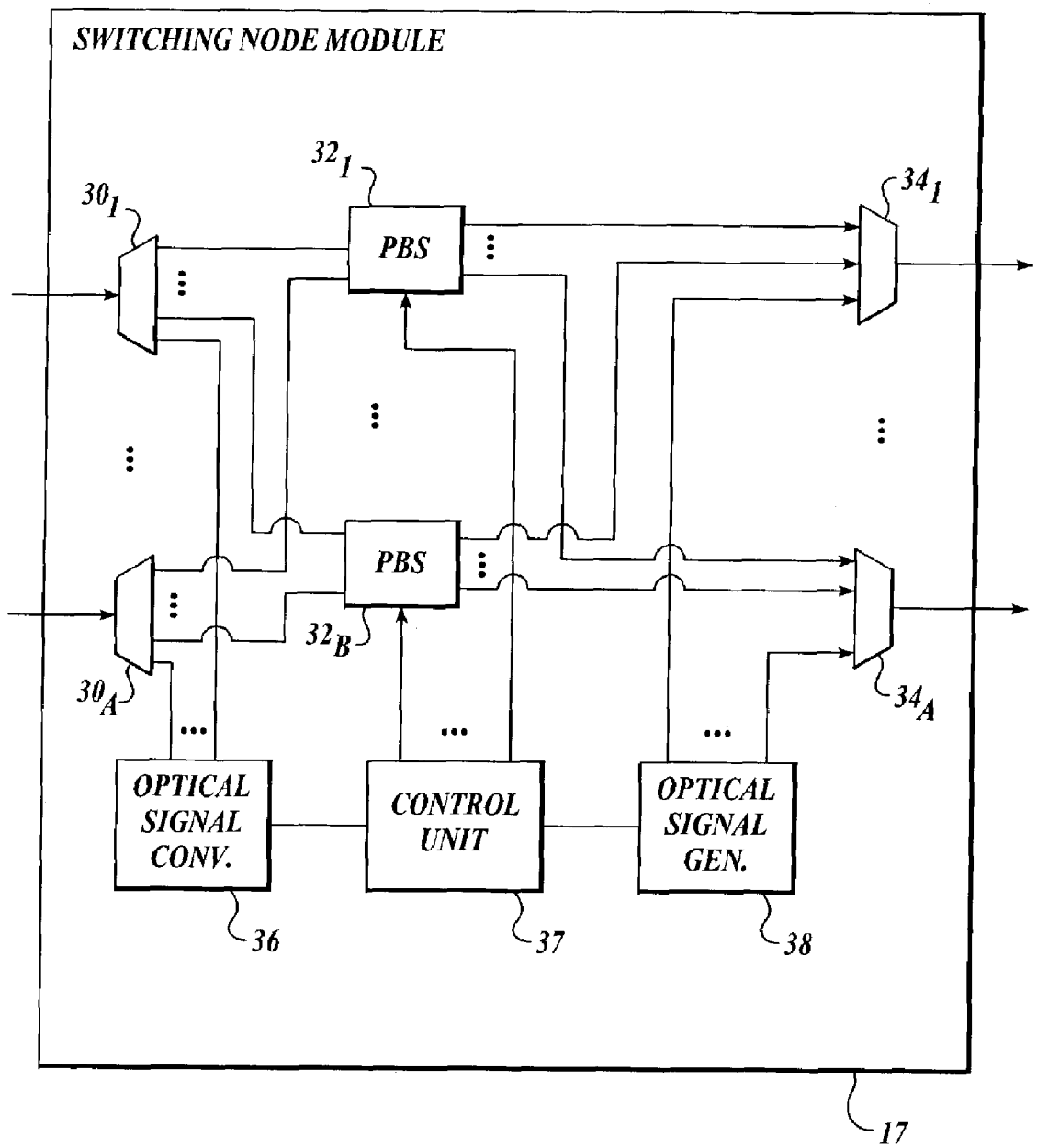
FIG. 3 is a block diagram illustrating a switching node module for use in a PBS network, according to one embodiment of the present invention.

FIG. 3 illustrates a module 17 for use as a switching node in photonic burst switched network 10 (FIG. 1), according to one embodiment of the present invention. In this embodiment, module 17 includes a set of optical wavelength division demultiplexers $30_1$-$30_A$, where A represents the number of input optical fibers used for propagating payloads, labels, and other network resources to the module. For example, in this embodiment, each input fiber could carry a set of C wavelengths (i.e., WDM wavelengths), although in other embodiments the input optical fibers may carry differing numbers of wavelengths. Module 17 would also include a set of N×N photonic burst switches $32_1$-$32_B$, where N is the number of input/output ports of each photonic burst switch. Thus, in this embodiment, the maximum number of wavelengths at each photonic burst switch is A·C, where N≧A·C+1. For embodiments in which N is greater than A·C, the extra input/output ports can be used to loop back an optical signal for buffering.

Further, although photonic burst switches $32_1$-$32_B$ are shown as separate units, they can be implemented as N×N photonic burst switches using any suitable switch architecture. Module 17 also includes a set of optical wavelength division multiplexers $34_1$-$34_A$, a set of optical-to-electrical signal converters 36 (e.g., photo-detectors), a control unit 37, and a set of electrical-to-optical signal converters 38 (e.g., lasers). Control unit 37 may have one or more processors to execute software or firmware programs.

Figure 10:
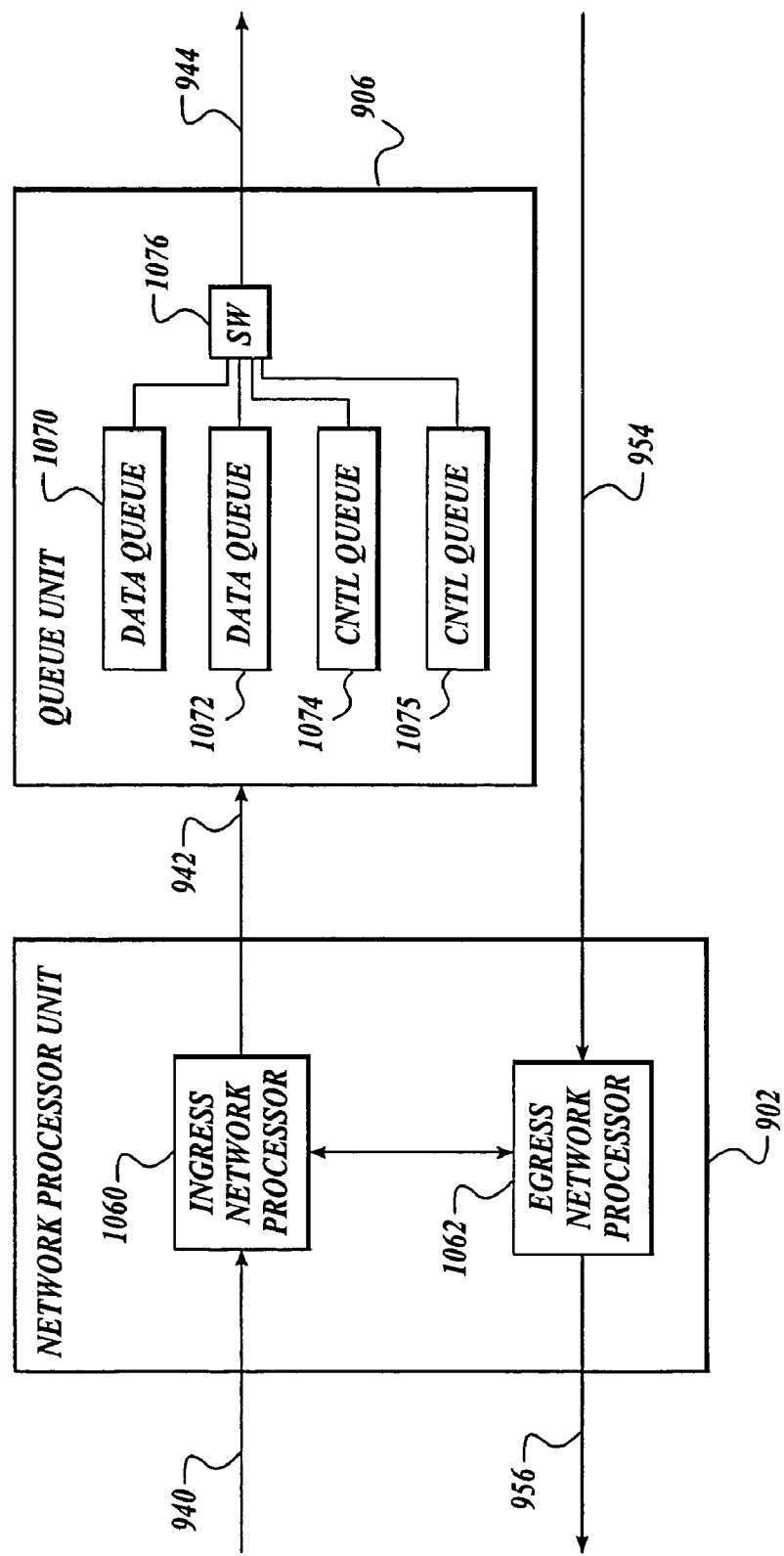
FIG. 10 is a block diagram illustrating in more detail the network processor unit and the queue unit depicted in FIG. 9, according to one embodiment of the present invention.

The elements of this embodiment of module 17 are interconnected as follows. Optical demultiplexers $30_1$-$30_A$ are connected to a set of A input optical fibers that propagate input optical signals from other switching nodes of photonic burst switched network 10 (FIG. 10). The output leads of the optical demultiplexers are connected to the set of B core optical switches $32_1$-$32_B$ and to optical signal converter 36. For example, optical demultiplexer $30_1$ has B output leads connected to input leads of the photonic burst switches $32_1$-$32_B$ (i.e., one output lead of optical demultiplexer $30_1$ to one input lead of each photonic burst switch) and at least one output lead connected to optical signal converter 36.

The output leads of photonic burst switches $32_1$-$32_B$ are connected to optical multiplexers $34_1$-$34_A$. For example, photonic burst switch $32_1$ has A output leads connected to input leads of optical multiplexers $34_1$-$34_A$ (i.e., one output lead of photonic burst switch $32_1$ to one input lead of each optical multiplexer). Each optical multiplexer also an input lead connected to an output lead of electrical-to-optical signal converter 38. Control unit 37 has an input lead or port connected to the output lead or port of optical-to-electrical signal converter 36. The output leads of control unit 37 are connected to the control leads of photonic burst switches $32_1$-$32_B$ and electrical-to-optical signal converter 38. As described below in conjunction with the flow diagram of FIG. 5, module 17 is used to receive and transmit optical control bursts, optical data bursts, and network management control bursts. In one embodiment, the optical data bursts and optical control bursts have transmission formats as shown in FIGS. 4A and 4B.

Figure 4A:
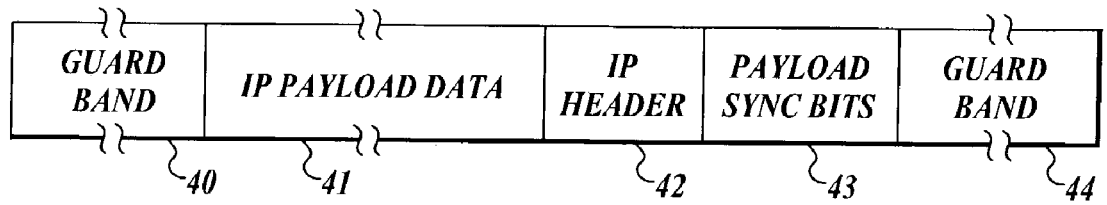
FIGS. 4A-4B are diagrams illustrating the formats of an optical data and control bursts for use in a PBS network, according to one embodiment of the present invention.

FIG. 4A illustrates the format of an optical data burst for use in PBS network 10 (FIG. 1), according to one embodiment of the present invention. In this embodiment, each optical data burst has a start guard band 40, an IP payload data segment 41, an IP header segment 42, a payload sync segment 43 (typically a small number of bits), and an end guard band 44 as shown in FIG. 4A. In some embodiments, IP payload data segment 41 includes the statistically-multiplexed IP data packets or Ethernet frames used to form the burst. Although FIG. 4A shows the payload as contiguous, module 17 transmits payloads in a TDM format. Further, in some embodiments the data burst can be segmented over multiple TDM channels. It should be pointed out that in this embodiment the optical data bursts and optical control bursts have local significance only in PBS network 10, and may loose their significance at the optical WAN.

Figure 4B:
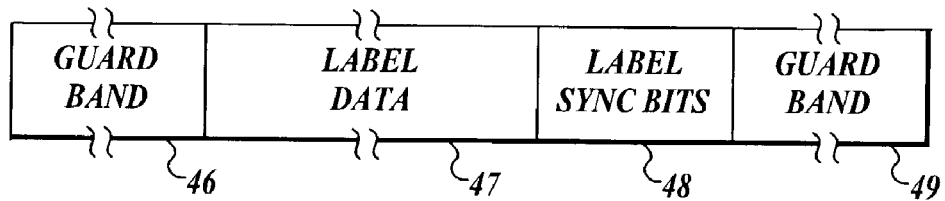

FIG. 4B illustrates the format of an optical control burst for use in photonic burst switched network 10 (FIG. 1), according to one embodiment of the present invention. In this embodiment, each optical control burst has a start guard band 46, an IP label data segment 47, a label sync segment 48 (typically a small number of bits), and an end guard band 49 as shown in FIG. 4B. In this embodiment, label data segment 45 contains all the necessary routing and timing information of the IP packets to form the optical burst. Although FIG. 4B shows the payload as contiguous, in this embodiment module 17 transmits labels in a TDM format.

In some embodiments, an optical network management control label (not shown) is also used in PBS network 10 (FIG. 1). In such embodiments, each optical network management control burst includes: a start guard band similar to start guard band 46; a network management data segment similar to data segment 47; a network management sync segment (typically a small number of bits) similar to label sync segment 48; and an end guard band similar to end guard band 44. In this embodiment, network management data segment contains network management information needed to coordinate transmissions over the network. In some embodiments, the optical network management control burst is transmitted in a TDM format.

Figure 5:
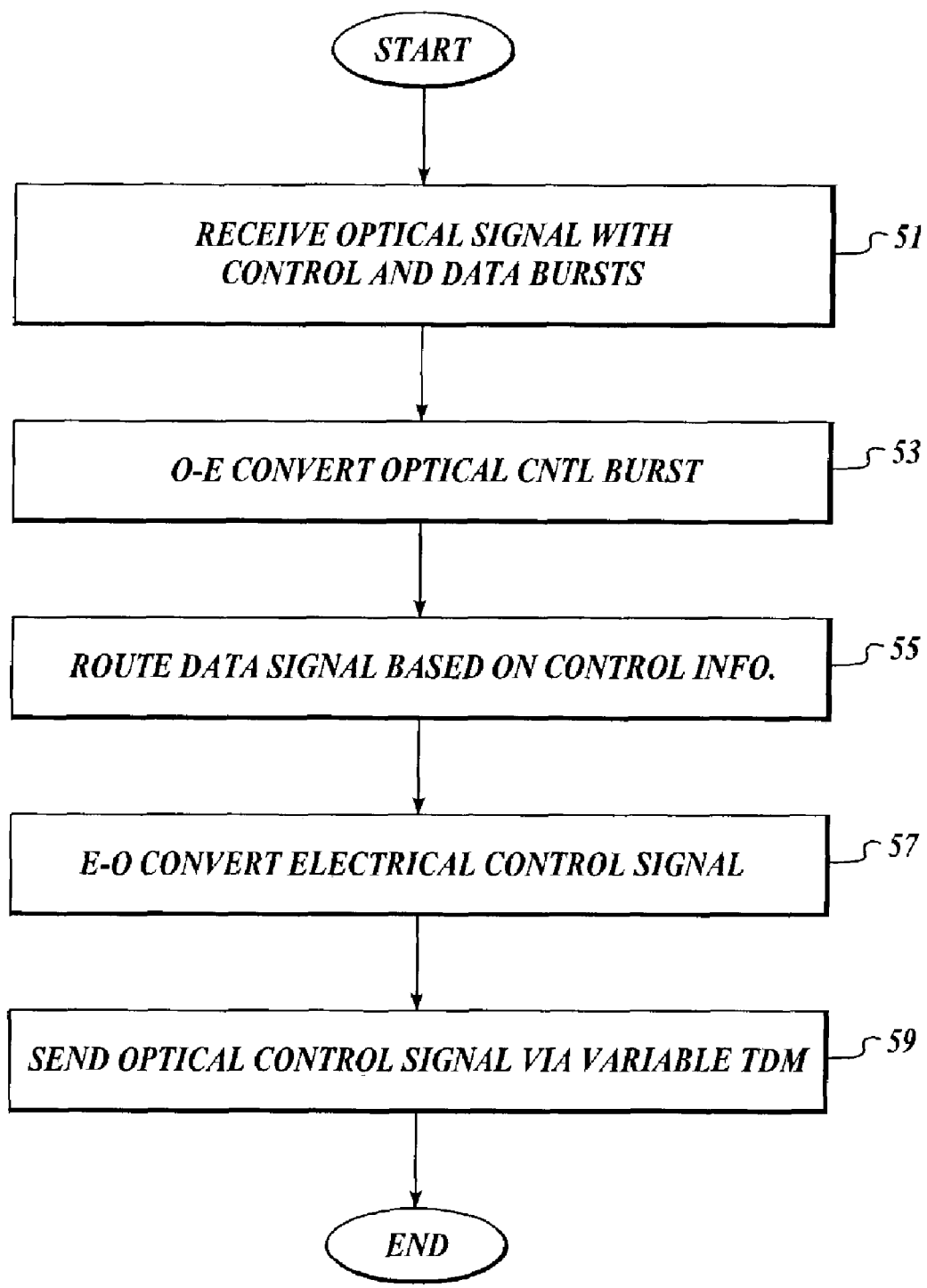
FIG. 5 is a flow diagram illustrating the operation of a switching node module, according to one embodiment of the present invention.

FIG. 5 illustrates the operational flow of module 17 (FIG. 3), according to one embodiment of the present invention. Referring to FIGS. 3 and 5, module 17 operates as follows.

Module 17 receives an optical signal with TDM label and data signals. In this embodiment, module 17 receives an optical control signal (e.g., an optical control burst) and an optical data signal (i.e., an optical data burst in this embodiment) at one or two of the optical demultiplexers. For example, the optical control signal may be modulated on a first wavelength of an optical signal received by optical demultiplexer $30_A$, while the optical data signal is modulated on a second wavelength of the optical signal received by optical demultiplexer $30_A$. In some embodiments, the optical control signal may be received by a first optical demultiplexer while the optical data signal is received by a second optical demultiplexer. Further, in some cases, only an optical control signal (e.g., a network management control burst) is received. A block 51 represents this operation.

Module 17 converts the optical control signal into an electrical signal. In this embodiment, the optical control signal is the optical control burst signal, which is separated from the received optical data signal by the optical demultiplexer and sent to optical-to-electrical signal converter 36. In other embodiments, the optical control signal can be a network management control burst (previously described in conjunction with FIG. 4B). Optical-to-electrical signal converter 36 converts the optical control signal into an electrical signal. For example, in one embodiment each portion of the TDM control signal is converted to an electrical signal. The electrical control signals received by control unit 37 are processed to form a new control signal. In this embodiment, control unit 37 stores and processes the information included in the control signals. A block 53 represents this operation.

Module 17 then routes the optical data signals (ie., optical data burst in this embodiment) to one of optical multiplexers $34_1$-$34_A$, based on routing information included in the control signal. In this embodiment, control unit 37 processes the control burst to extract the routing and timing information and sends appropriate PBS configuration signals to the set of B photonic burst switches $32_1$-$32_B$ to re-configure each of the photonic burst switches to switch the corresponding optical data bursts. A block 55 represents this operation.

Module 17 then converts the processed electrical control signal to a new optical control burst. In this embodiment, control unit 37 provides TDM channel alignment so that reconverted or new optical control bursts are generated in the desired wavelength and TDM time slot pattern. The new control burst may be modulated on a wavelength and/or time slot different from the wavelength and/or time slot of the control burst received in block 51. A block 57 represents this operation.

Module 17 then sends the optical control burst to the next switching node in the route. In this embodiment, electrical-to-optical signal generator 38 sends the new optical control burst to appropriate optical multiplexer of optical multiplexers $34_1$-$34_4$ to achieve the route. A block 59 represents this operation.

Figure 6:
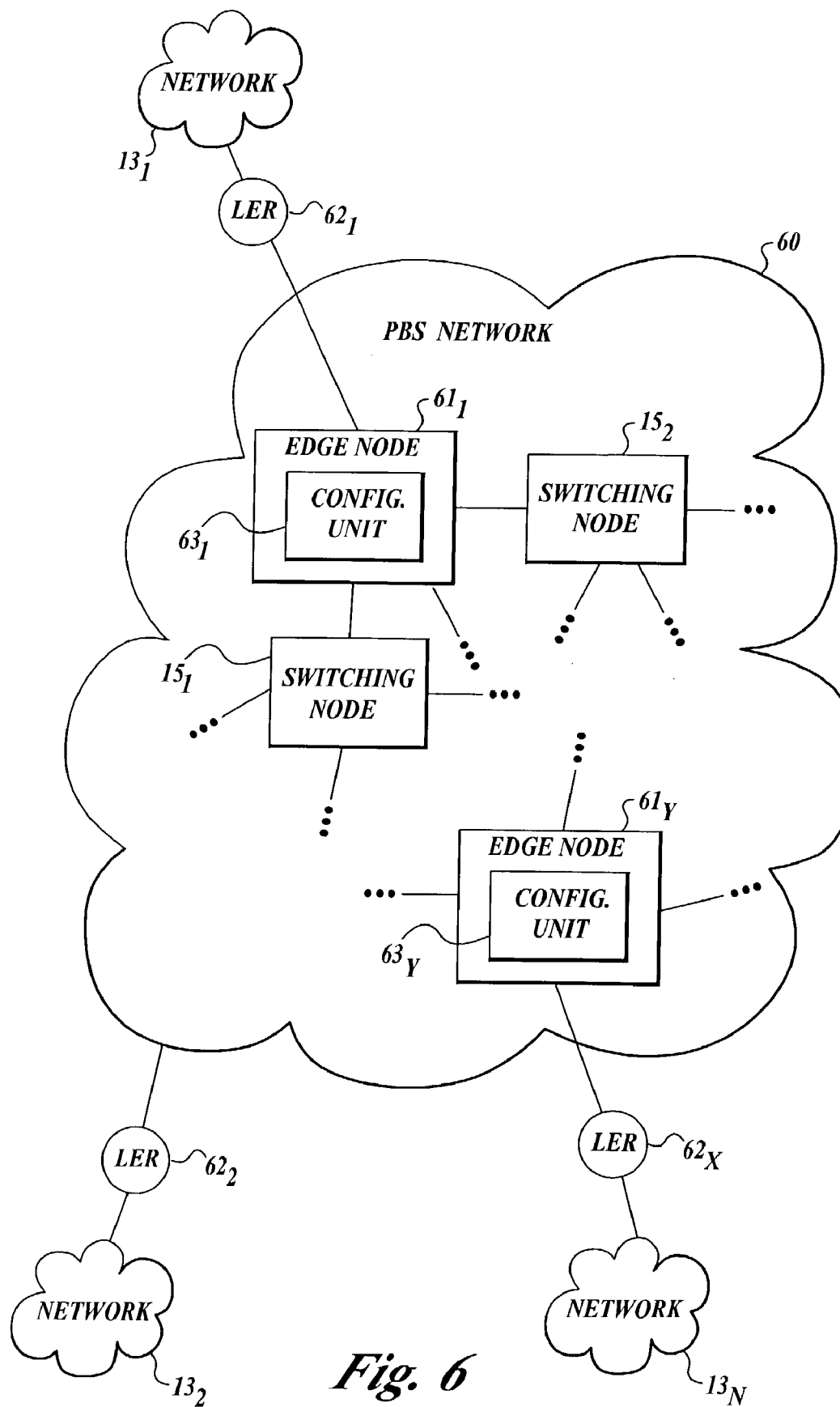
FIG. 6 is a diagram illustrating a PBS network with multi-server edge nodes, according to one embodiment of the present invention.

FIG. 6 illustrates a PBS network 60 with multi-server edge nodes, according to one embodiment of the present invention. In this example, PBS network 60 is similar to PBS network 10 (FIG. 1) except that one or more ingress and egress nodes are replaced with edge nodes $61_1$-$61_Y$. Edge nodes $61_1$-$61_Y$ include configuration units $63_1$-$63_Y$, respectively. The term "configuration unit", as used herein, refers to a unit within PBS network 60 such as, for example, servers (e.g., file or application), and/or storage devices. Server-based storage configurations include, for example, direct attached storage (DAS), network attached storage (NAS), or PBS-based storage area network (SAN). Examples of these configuration units are described below in conjunction with FIGS. 6A-6C.

In this embodiment, networks $13_1$-$13_N$ are connected to edge nodes $61_1$-$61_Y$ via label edge routers (LERs) $62_1$-$62_X$. In some embodiments networks $13_1$-$13_N$ are LAN, WAN, and/or other PBS networks. In some embodiments, the network can be connected directly to an edge node without a LER. The nodes (i.e., ingress, egress, edge, and switching nodes) of PBS network 60 are interconnected as previously described in conjunction with PBS network 10 (FIG. 1).

For clarity, the operation of PBS network 60 is described below using an example in which configuration units $62_1$-$62_X$ are multi-server units. In typical applications, the multi-server units can support high bandwidth and/or delay sensitive applications such as, for example, file server, mail server, media server, application server, web server, etc. applications. The operation is similar when configuration units are used for storage applications.

The operation of PBS network 60 is significantly different from conventional networks having conventional servers such as server farms or blade servers. In conventional LAN/WAN networks, the servers are simply other devices connected to the network, competing for network resources such as bandwidth. In some applications, servers communicate with each other over the LAN/WAN network. However, the servers provide little or no network provisioning and traffic engineering functionality. Thus, the traffic on the network is transmitted on a best effort basis, representing a bottleneck in the transfer of information between multi-server units.

In contrast, this embodiment of PBS network 60 avoids this bottleneck by modifying conventional multi-server or storage units to serve as edge nodes $61_1$-$61_Y$ in a PBS network. These modified multi-server units (i.e., configuration units $63_1$-$63_Y$) have an optical PBS interface (e.g., see FIG. 6A) and aggregate information into optical PBS control and data bursts to be sent over the PBS network. As previously described, the PBS network provides high speed networking, especially in applications in which the information transfers are "bursty" as in some packet-type communication protocols (e.g., IP and Ethernet). One embodiment of a multi-server unit is described below in conjunction with FIG. 7.

Figure 6A:
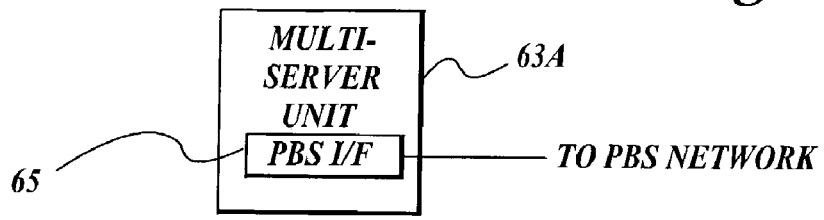
FIGS. 6A-6C are diagrams illustrating configuration units depicted in FIG. 6, according to embodiments of the present invention.

FIG. 6A illustrates an embodiment of a configuration unit 63A that can be used to implement one or more of configuration units $63_1$-$63_Y$ (FIG. 6). The multi-server unit includes a PBS interface 65, which can form/transmit PBS control and data bursts optically over the PBS network; and can receive/process optical PBS bursts from the PBS network. One embodiment is described in more detail below in conjunction with FIG. 7.

In some embodiments, the servers of configuration unit 63A (and/or other multi-server configuration units in the PBS network) can be organized into one ore more server clusters. Each server cluster is seen as a single server by other clients connected to the PBS network. Such embodiments can provide load balancing (which can improve performance) and fault recovery capability to recover from, for example, server or other hardware failures, server software failures, or connection failures. In addition, clustering can be used in these embodiments to selectively connect or disconnect a server (or servers) from the cluster, which effectively disconnects it from the PBS network.

To form a cluster, each server in the cluster includes clustering software to detect faults, perform failover operations, and perform load balancing operations. The clustering software can also include components to support selective connect/disconnect of servers from the cluster, which will effectively add/remove them from the PBS Network. Suitable clustering software is commercially available for several operating systems used in servers. For hardware, the servers in the cluster are interconnected via a network (typically separate from the network used by clients) used for communication/polling between the servers of the cluster. The hardware can also include redundant storage devices that are shared by the servers in the cluster either through direct connection or via one or more hubs.

Figure 6B:
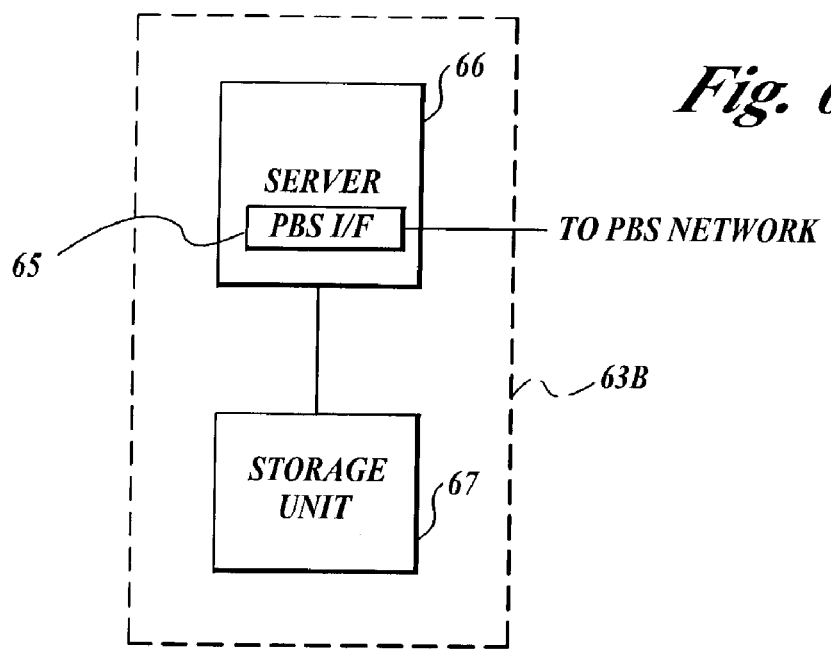

FIG. 6B illustrates a configuration unit 63B that can be used to implement one or more of configuration units $63_1$-$63_Y$ (FIG. 6), according to one embodiment of the present invention. In this embodiment, configuration unit 63B includes a server 66 with an attached storage unit 67 for use as a DAS unit. Server 66 includes PBS interface 65 for transferring data over the PBS network. Storage unit 67 can be implemented with one or more hard drives, disk array, tape drives, etc., and typically communicates with server 66 via various types of interfaces such as a small computer system interface (SCSI), Internet SCSI (iSCSI) interface, fiber channel (FC) interface, etc. In operation, information stored by storage unit 67 is available to other units connected to the PBS network via server 66.

Figure 6C:
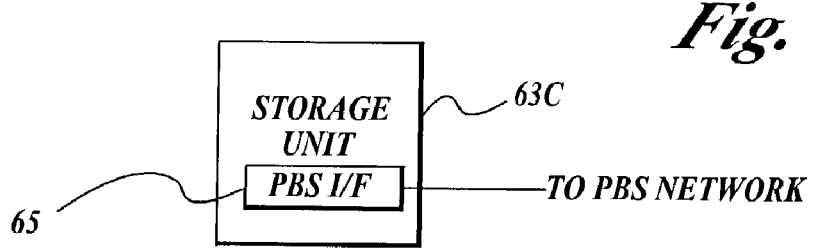

FIG. 6C illustrates an embodiment of a configuration unit 63C that can be used to implement one or more of configuration units $63_1$-$63_Y$ (FIG. 6). In this embodiment, configuration unit 63C is implemented with a storage unit with PBS interface 65 (i.e., no server is present). Configuration unit 63C can be used as a NAS unit in PBS network 60. For example, PBS network 60 can include one edge node having configuration unit 63C, with the rest of the edge nodes having configuration units like configuration unit 63A. This configuration allows all of the other edge nodes to access the storage unit directly via lightpaths in PBS network 60. However, in this NAS application, storage traffic is added to all of the other PBS traffic, which might decrease the performance of the PBS network.

In another configuration, configuration unit 63C can be used to implement all of configuration units $63_1$-$63_Y$ in PBS network 60 so that PBS network 60 functions like a SAN. In this configuration, PBS network 60 provides a network that is dedicated to storage traffic. Other networks (e.g., networks $13_1$-$13_N$ in FIG. 6) can then access the storage available in PBS network 60 via an edge node's egress capability.

Figure 7:
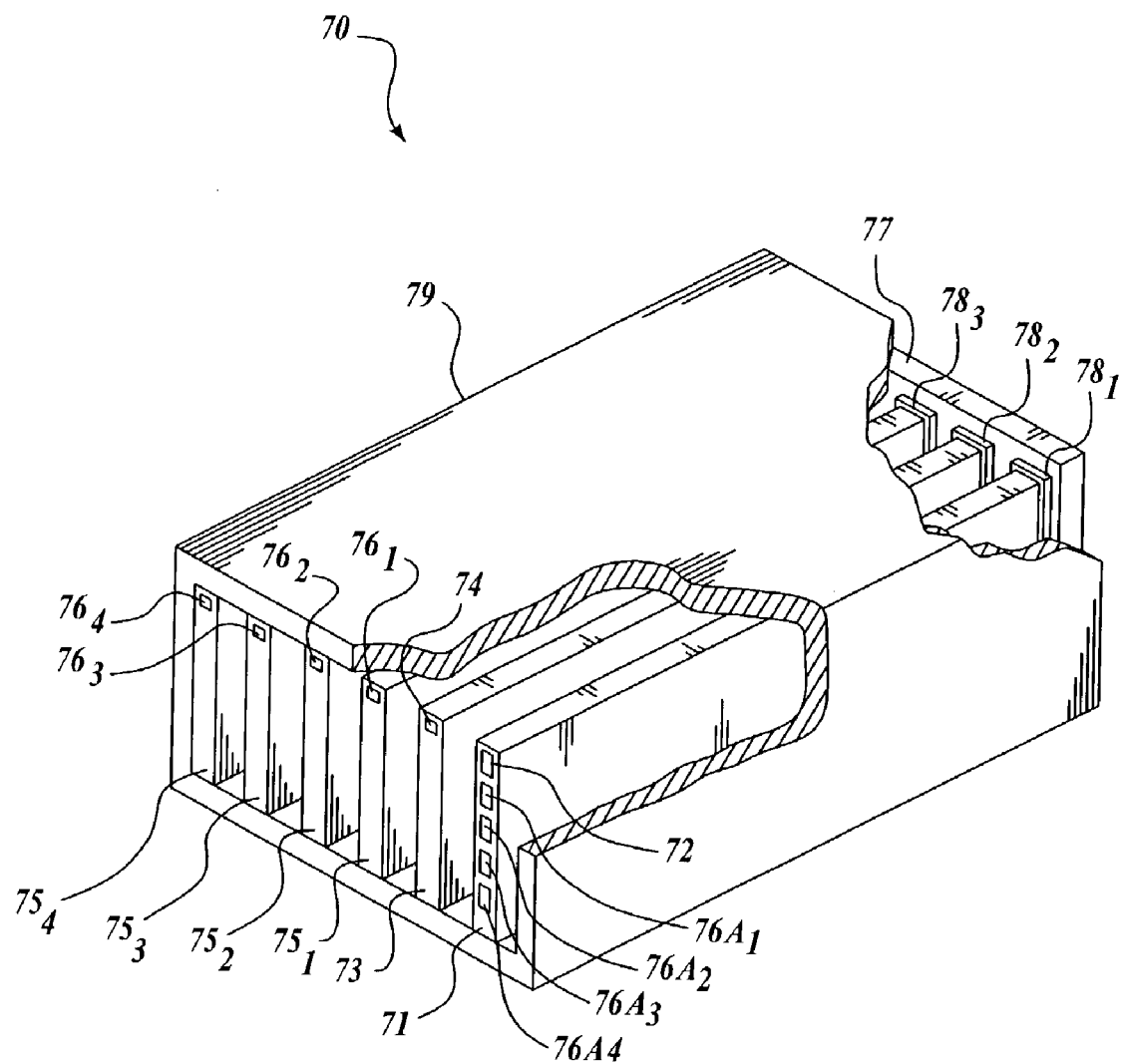
FIG. 7 is a diagram illustrating a modular reconfigurable multi-server unit at PBS edge node, according to one embodiment of the present invention.

FIG. 7 illustrates a modular reconfigurable multi-server unit 70 located at the PBS edge node, according to one embodiment of the present invention. In this embodiment, unit 70 includes an optical I/O card or module 71 having a PBS optical port 72, a legacy interface card or module 73 having a legacy port 74, four server cards or modules $75_1$-$75_4$, a backplane 77, connectors $78_1$-$78_6$ (only connectors $78_1$-$78_3$ are visible in FIG. 7) and a chassis 79.

In addition, in this embodiment, server modules $75_1$-$75_4$ include PBS optical ports $76_1$-$76_4$, respectively, and optical I/O module 71 includes corresponding PBS optical ports $76A_1$-$76A_4$ In other embodiments, unit 70 may include fewer or more than four server modules. On embodiment of optical I/O module 71 is described below in conjunction with FIG. 8, and one embodiment of a server module is described below in conjunction with FIGS. 9 and 10.

In this embodiment, legacy interface card 73 is, for example, a gigabit Ethernet (GbE) card for communicating with a LER or other LAN/WAN networks using a GbE Ethernet protocol. In other embodiments, different legacy protocols can be used. In this embodiment, server modules $75_1$-$75_4$ are self-contained high-speed server modules, where a single or multiple servers are implemented as a single integrated module. In some embodiments, backplane 77 includes an electronic switching fabric with buffers and with electrical buses (see FIG. 8), power supply, control, etc., similar to those used in commercially available blade server systems. In some embodiments, the interconnect topologies of backplane 77 include star (e.g., server modules are connected through a centralized switch), tree, dual-star, ring, and fully-mesh configurations. In one embodiment, for example, the dual-star backplane configuration uses two redundant switching fabrics connected to each server module $75_1$-$75_4$ with the suitable electrical interfaces (e.g., PCI or PCI-Express, InfiniBand interfaces) for improved reliability. In other embodiments, the backplane can include other types of wired switching fabrics and topologies. Wired switching fabrics as used herein can also refer to optical switching fabrics or a hybrid combination of optical and electronic switching fabrics.

These elements of unit 70 are interconnected as follows. Optical I/O module 71, legacy I/F module 73 and server modules $75_1$-$75_4$ are connected to backplane 77 (and the aforementioned electrical switching fabric) via connectors $78_1$-$78_6$. In addition, ports $76_1$-$76_4$ of server modules $75_1$-$75_4$ are optically connected to ports $76A_1$-$76A_4$ of optical I/O module 71 using optical fibers (not shown), for example. Optical port 72 is connected to a PBS network (e.g., PBS network 60 in FIG. 6). Legacy port 74 is connected to a legacy network or LER (e.g., see FIG. 6). Chassis 79 houses and physically supports the modules, connectors and backplane. Chassis 79 also includes other units (e.g., power supplies, cooling fan or fans, etc.) that are not shown in FIG. 7 to avoid obscuring the invention. In some embodiments, the order of the modules (i.e., server modules $75_1$-$75_4$, legacy interface module 73, and optical I/O module 71) in the chassis 79 may be different from the one shown in FIG. 7.

In operation, this embodiment of unit 70 can operate to transfer information in several ways. In one type of transfer operation, unit 70 can operate as a conventional multi-server unit providing services to clients coupled to the legacy network. For example, in one embodiment, data traffic between the client and a server module (ie., one of server modules $75_1$-$75_4$) can be carried via legacy interface module 73, backplane 77 and the appropriate server of server modules $75_1$-$75_4$, as in a conventional multi-server unit.

In a second way of transferring information, a server module (ie., one of server modules $75_1$-$75_4$) can provide services to a client via the PBS network and optical I/O module 71. However, unlike in a conventional multi-server unit, optical I/O module 71 includes an optical PBS switch and a control unit similar to that of a switching node (see FIG. 1).

More particularly, optical I/O module 71 receives optical PBS bursts via the PBS network from the client. The optical PBS bursts include at least an optical PBS control burst and an optical PBS data burst. Optical I/O module 71 receives the control burst and performs O-E conversion to extract the control information, which it then uses to configure the optical PBS switch. In one embodiment, optical I/O module 71 performs these operations in substantially the same manner as the previously described switching nodes of PBS network 10 (FIG. 1).

Optical I/O module 71 then receives the associated PBS data burst(s), which are then de-multiplexed to the destination server module of server modules $75_1$-$75_4$ without O-E conversion. In one embodiment, optical I/O module 71 performs these operations in substantially the same manner as the previously described switching nodes of PBS network 10 (FIG. 1). The destination server module can then O-E convert, de-frame and process the received optical PBS burst(s) as previously described for an ingress node of PBS network 10 (FIG. 1).

In a third way of transferring information, a server module of unit 70 can transfer information to a client via the PBS network in the form of optical PBS bursts (i.e., at least a control burst and a data burst) to optical I/O module 71, which then transfers the optical PBS bursts to the PBS network. In one embodiment, optical I/O module 71 processes the optical bursts from the server module in substantially the same manner as the previously described for switching nodes of PBS network 10 (FIG. 1). For example, optical I/O module 71 performs O-E conversion of the control burst and generates a new control burst for transmission to the next node in the light path. In response to the control information in the control burst, I/O module 71 optically switches the associated data burst when it arrives from the server module following the control burst. Unlike conventional multi-server units, the server module of unit 70 statistically multiplexes the traffic flows (e.g., IP packets, Ethernet frames) to form PBS control and data bursts in substantially the same manner as previously described for an ingress node of a PBS network 10 (FIG. 1). The PBS burst(s) are then framed, scheduled, E-O converted and transmitted to the client via the PBS network as previously described for PBS network 10.

PBS data bursts addressed to a server module of unit 70 is received by optical I/O module 71. Under these circumstances, optical I/O module 71 functions as a switching node to optically switch the incoming optical data burst(s) to the destination server module in response to the control information extracted from the associated PBS control burst (received prior to the PBS data burst or bursts). The server module can then O-E converts the received PBS data burst and process the data.

In a fourth way of transferring information, PBS network traffic between one or more server modules of unit 70 and the PBS network can be routed through I/O module 71 (as described in the aforementioned U.S. patent application Ser. No. 10/417,823 via backplane 77. The information from the server module(s) is aggregated and formed into PBS bursts in substantially the same manner as an ingress node of PBS network 10 (FIG. 1). Information from the PBS network addressed for a server module(s) of unit 70 is received by optical I/O module 71 at PBS optical port 72. Optical I/O module 71 O-E converts the optical control and data burst(s), de-frames the PBS burst(s), and de-multiplexes PBS control and data bursts into individual flows (consisting, for example, of either IP packets and/or Ethernet frames). Then, the individual flows are transferred to the destination server module(s) via backplane 77.

In a fifth way of transferring information, traffic coming into unit 70 from a legacy network can be transferred to a destination connected to the PBS network. In one embodiment, the information is received by unit 70 at legacy port 74. As previously stated, the legacy network can use a conventional networking protocol such as, for example, TCP/IP or Ethernet protocols. In this embodiment, the legacy network is an electrical GbE network, although other wired or wireless networks can be used in other embodiments. Legacy interface module 73 transmits the information received at legacy port 74 to optical I/O module 71 via backplane 77 in the same manner as any server module transfers information over backplane 77. Optical I/O module 71 forms the information from legacy interface module 73 into PBS burst(s) in substantially the same manner as previously described for an ingress node of a PBS network 10 (FIG. 1). The PBS burst(s) are then scheduled, E-O converted and transmitted to the client via the PBS network as previously described for PBS network 10.

Conversely, traffic coming into unit 70 from the PBS network for transfer to a destination via the legacy network is received by unit 70 at PBS optical port 72 in the form of optical control and data PBS burst(s). Optical I/O module 71 O-E converts the optical control and data burst(s) received at PBS optical port 72, de-frames the PBS burst(s), and de-multiplexes PBS control and data bursts into individual flows consisting, for example, of either IP packets and/or Ethernet frames). Then, the individual flows are transferred to legacy interface module 73 via backplane 77. Legacy interface module 73 then transfers the individual traffic flows to the legacy network.

Figure 8:
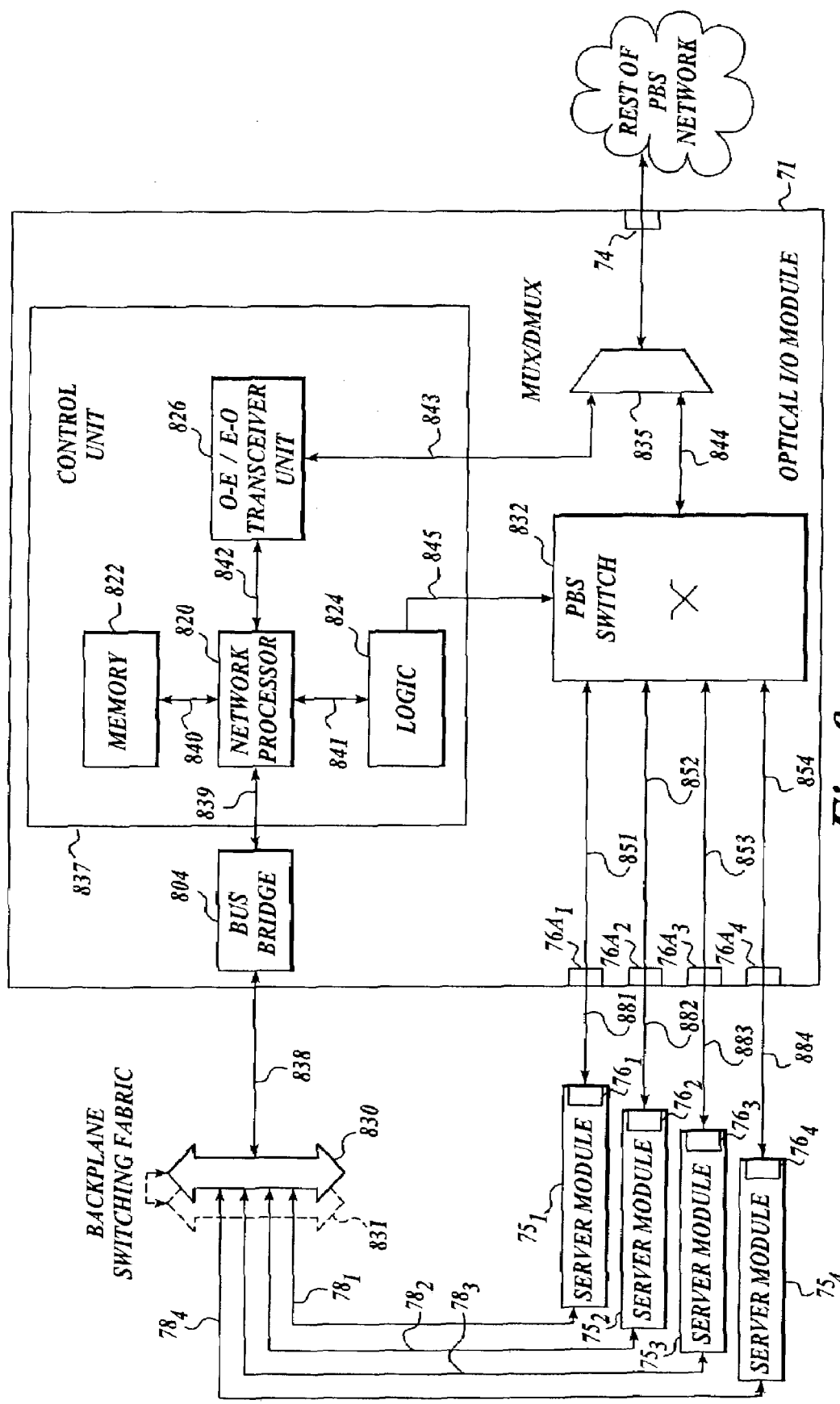
FIG. 8 is a block diagram illustrating an optical I/O module with optical switching fabric as depicted in FIG. 7, according to one embodiment of the present invention.

FIG. 8 illustrates part of an optical I/O module 71 (FIG. 7), according to one embodiment of the present invention. In this embodiment, optical I/O module 71 includes a bus bridge 804, a 4×1 PBS optical switch 832, a MUX/DMUX unit 835, and a control unit 837 (which in one embodiment is substantially similar to control unit 37 of FIG. 3). In other embodiments, PBS optical switch 832 can be an $N_S \times 1$ switch, with $N_S$ being equal to the number of server modules that unit 70 (FIG. 7) can hold. In yet other embodiments, PBS optical switch 832 can be an $N_S \times M$ switch, with M being an integer greater than or equal to one. Further, in one embodiment, backplane 77 (FIG. 7) includes a switching fabric 830. The switching fabric 830, in this embodiment, is an electronic switching fabric that is connected to server modules $75_1$-$75_4$ through electrical bus interfaces such as, for example, a PCI Express bus interface, although any other suitable bus interfaces may be used in other embodiments. Thus, for example, in one embodiment bus-bridge 804 can be implemented using a commercially available PCI bridge device or chip set. In other embodiments, backplane 77 may include more than one switching fabric. For example, as shown in FIG. 8, an optional second switching fabric 831 (shown in dashed lines) is interconnected to server modules $75_1$-$75_4$ and to switching fabric 830 for failure protection.

In this embodiment, control interface unit 837 includes a network processor 820, a memory unit 822 (i.e., including memory devices such as SDRAM), a logic circuit 824 (serving as glue logic between network processor 820 and PBS optical switch 832), and a transceiver unit 826. In this embodiment, transceiver unit 826 includes O-E and E-O conversion circuitry and framing/de-framing circuitry (not shown). In some embodiments, transceiver unit 826 includes more than one transceiver.

The above elements of optical I/O unit 71 are interconnected as follows in this embodiment. Bus bridge 804 is connected to switching fabric 830 to support parallel bi-directional traffic via interconnect 838. Bus bridge 804 is also connected to network processor 820 via an electrical interconnect 839. Electrical interconnects 838, 839 and other signal interconnects in FIG. 8 are depicted as single interconnect wire or optical path (e.g., an optical waveguide) for clarity, even though the connection may include several signal interconnect wires or optical paths. In other embodiments that include additional switching fabrics, bus bridge 804 may be connected to one or more of the additional switching fabrics as well as to switching fabric 830.

Network processor 820 is connected to memory unit 822 and logic circuit 824 via interconnects 840 and 841, respectively. Network processor unit 820 is connected to transceiver unit 826 via interconnect 842. Transceiver unit 826 is connected to one port of MUX/DMUX unit 835 via an optical interconnect 843. Another port of MUX/DMUX unit 835 is connected to a port of PBS optical switch 832 via an optical interconnect 844. In addition, PBS optical switch 832 is connected to logic circuit 824 via electrical interconnect 845. PBS optical switch 832 is also connected to ports $76A_1$-$76A_4$ of I/O module 71 via optical interconnects 851-854, respectively.

In this embodiment, optical ports $76A_1$-$76A_4$ of I/O module 71 are connected to ports $76_1$-$76_4$ of server modules $75_1$-$75_4$ via optical interconnects 881-884, respectively. In one embodiment, optical interconnects 881-884 are single-mode fibers (SMFs). In other embodiments, optical interconnects 881-884 are single-mode optical waveguides. Server modules $75_1$-$75_4$ are connected to electronic switching fabric 830 via connectors $78_1$-$78_4$, respectively (indicated schematically as lines in FIG. 8).

In operation, one embodiment of optical I/O module 71 optically transfers information from the server modules to the PBS network as follows. Optical I/O module 71 can receive PBS control bursts from the server modules in order to configure PBS optical switch 832 for subsequent optical PBS data burst(s). For example, server module $75_1$ can electrically transmit the PBS control burst to optical I/O control module 71 via interconnect $78_1$, switching fabric 830, and interconnect 838. Control unit 837 of optical I/O module 71 receives the electrical PBS control burst via bus bridge 804 and interconnect 839. Responsive to the PBS control burst, network processor 820 of control unit 837 configures PBS optical switch 832 to appropriately switch one or more associated optical PBS data bursts via interconnect 841, logic circuit 824 and interconnect 845.

After a suitable time delay, server modules $75_1$-$75_4$ can then optically transmit PBS data bursts to an optical I/O module 71. For example, server module $75_1$ can optically transmit the associated PBS data burst(s) from its optical port $76_1$ to optical port $76A_1$ of optical I/O module 71 via optical interconnect. PBS optical switch 832 receives the optical PBS data bursts via optical interconnects 851-854. PBS optical switch 832 has already been configured according to the previously received PBS control burst associated with the data burst. Consequently, PBS optical switch 832 optically switches the optical data burst (without O-E-O conversion) to the PBS network via an optical interconnect 844, MUX/DMUX unit 835 and PBS port 74.

Similarly, optical I/O module 71 can receive optical PBS bursts from the PBS network via port 74. MUX/DMUX unit 835 demultiplexes control bursts to control unit 837 via optical interconnect 843. Transceiver unit 826 of control unit 837 extracts the control information from the optical burst and provides this information electrically to network processor 820 via an electrical interconnect 842. Network processor 820 can then use this information to configure PBS optical switch 832 as previously described. Then subsequently received associated optical PBS data burst(s) are demultiplexed by MUX/DMUX unit 835 to PBS optical switch 832 via an optical interconnect 844. PBS optical switch 832 (which had already been configured) can optically switch the data burst to the destination server module via ports $76A_1$-$76A_4$. In this embodiment, optical I/O module 71 need not generate another control burst because optical I/O module 71 is the terminus with respect to the PBS network.

In alternative embodiments, server modules $75_1$-$75_4$ can be configured to provide optical PBS control bursts to optical I/O module via optical interconnects 881-884. For example, in one alternative embodiment, the server modules can transmit in-band optical PBS control bursts to optical I/O module 71. In this alternative embodiment, optical I/O module 71 includes an optical splitter unit (not shown), which splits a portion of any optical signal received via optical ports $76A_1$-$76A_4$ to transceiver unit 826. Transceiver unit 826 can then O-E convert the PBS control burst and provide the converted control burst to network processor 820. Network processor 820 can configure PBS optical switch 832 for the reserved TDM channel bandwidth responsive to the control bursts, as previously described. Note, although PBS optical switch 832 will also receive the remaining portion of the optical control bursts via interconnects 851-854, PBS optical switch 832 will not be yet be configured for the reserved bandwidth, thereby preventing the optical control bursts from being transmitted to the rest of the PBS network.

In yet another alternative embodiment, the server modules can transmit OOB optical PBS control bursts to optical I/O module 71. In this alternative embodiment, optical I/O module 71 includes another optical MUX/DMUX unit (not shown) between optical ports $76A_1$-$76A_4$ and PBS optical switch 832. This second optical MUX/DMUX unit demultiplexes the OOB PBS optical control bursts to transceiver unit 826. The control burst can then be processed as described for the previous alternative embodiment to configure PBS optical switch 832 for the associated optical PBS data bursts.

Figure 9:
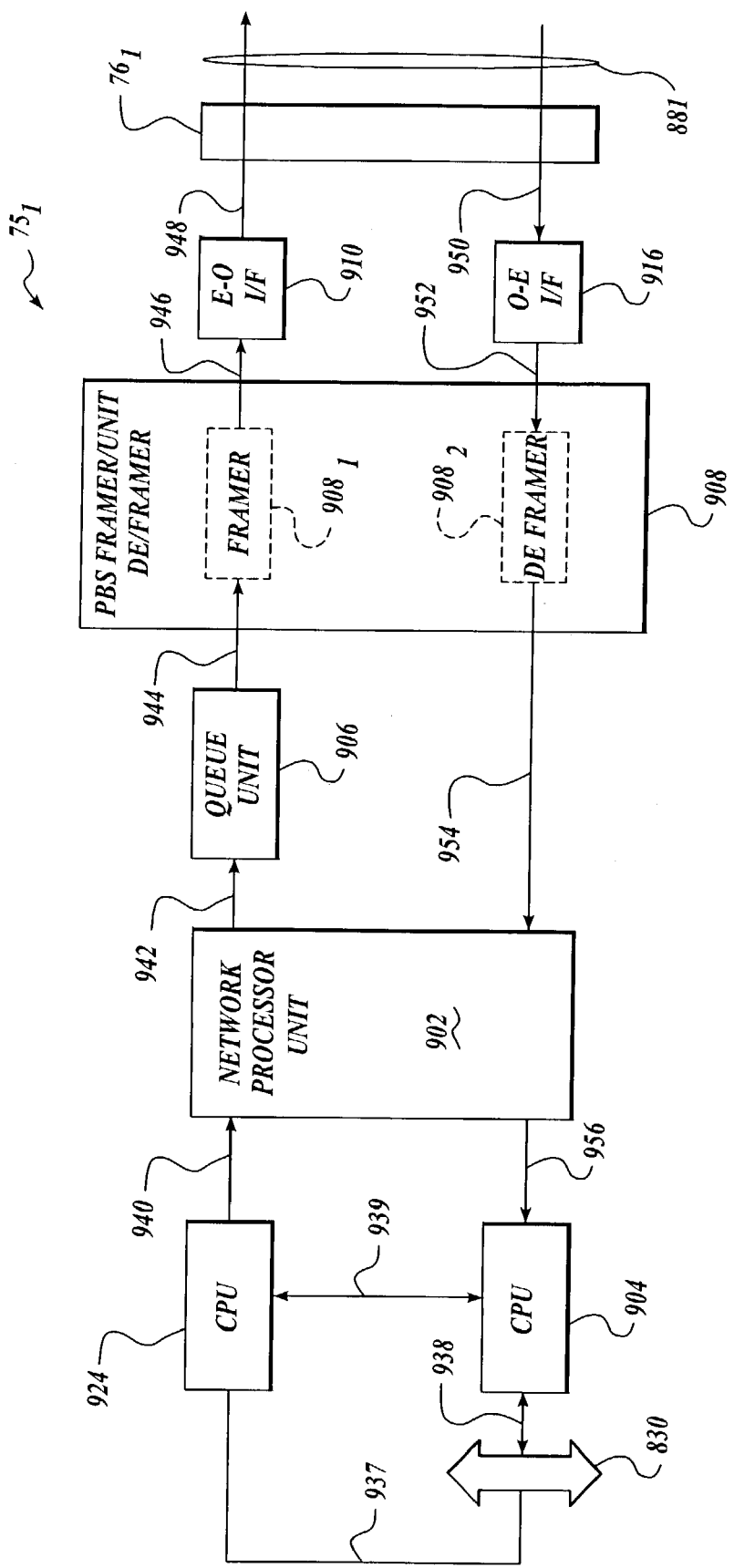
FIG. 9 is a block diagram illustrating a server module with optical transceiver interface as depicted in FIG. 7, according to one embodiment of the present invention.

FIG. 9 illustrates server module $75_1$ (FIG. 7), according to one embodiment of the present invention. Server modules $75_2$-$75_4$, in this embodiment, are substantially identical to server module $75_1$. In this embodiment, server module $75_1$ includes a network processor unit 902 (this unit could have multiple network processors), a central processing unit (CPU) 904, a queue unit 906, a framer unit 908 (having framer and de-framer functions as indicated by blocks $908_1$ and $908_2$), an E-O interface 910, an O-E interface unit 916, and another CPU 924. In one embodiment, an electronic switching fabric 830 includes PCI Express bus interfaces, although any other suitable bus or buses may be used in other embodiments.

In this embodiment, these elements of server module $75_1$ are interconnected as follows. CPU 904 is connected to switching fabric 830 to support parallel bi-directional traffic via interconnect 938. Similarly, CPU 924 is connected to switching fabric 830 via interconnect 937. CPUs 924 and 904 are connected to network processor unit 902 via interconnects 940 and 956, respectively. Network processor unit 902 is connected to queue unit 906 via interconnect 942. Queue unit 906 is in turn connected to PBS framer/de-framer unit 908 via an interconnect 944. In embodiments having multiple switching fabrics, CPUs 924 and 904 can be connected to the multiple switching fabrics.

As shown in FIG. 10, in some embodiments, network processor unit 902 includes an ingress network processor 1060 and an egress network processor 1062. Thus, in some embodiments of server module $75_1$, interconnect 940 is connected to ingress network processor 1060, and interconnect 956 is connected to egress network processor 1062.

Further, as shown in FIG. 10, in some embodiments, queue unit 906 can include data queues 1070 and 1072, control queues 1074 and 1075, and an electrical switch or demultiplexer 1076 coupled to the output ports of queues 1070, 1072 and 1074. Thus, in some embodiments, the input ports of queues 1070, 1072, 1074 and 1075 are connected to interconnect 942 via a switch or multiplexer (not shown). Also, in some embodiments, the output port of switch 1076 can be connected to interconnect 944.

In other embodiments, a different number of processors (e.g., a single processor) can be used in network processor unit 902. Further, in some embodiments, a different number of queues can be used in queue unit 906. For example, queue unit need not include a dedicated control queue and/or two data queues. Multiple queues can be used to provide buffering for building multiple control and data bursts with different properties such as different priorities.

Referring again to FIG. 9, PBS framer unit 908 is connected to E-O interface 910 via an interconnect 946. E-O interface 910 is in turn is connected to the rest of PBS network 60 (FIG. 6) via an interconnect 948 and port $76_1$. O-E interface 916 connected to the rest of PBS network 60 via a interconnect 950 and port $76_1$. O-E interface 916 is also connected to framer unit 908 via an interconnect 952. Framer unit 908 is also connected to network processor unit 902 via a interconnect 954. The operation of server module $75_1$ in transferring information to and from the PBS network is described below in conjunction with FIGS. 11 and 12.

Figure 11:
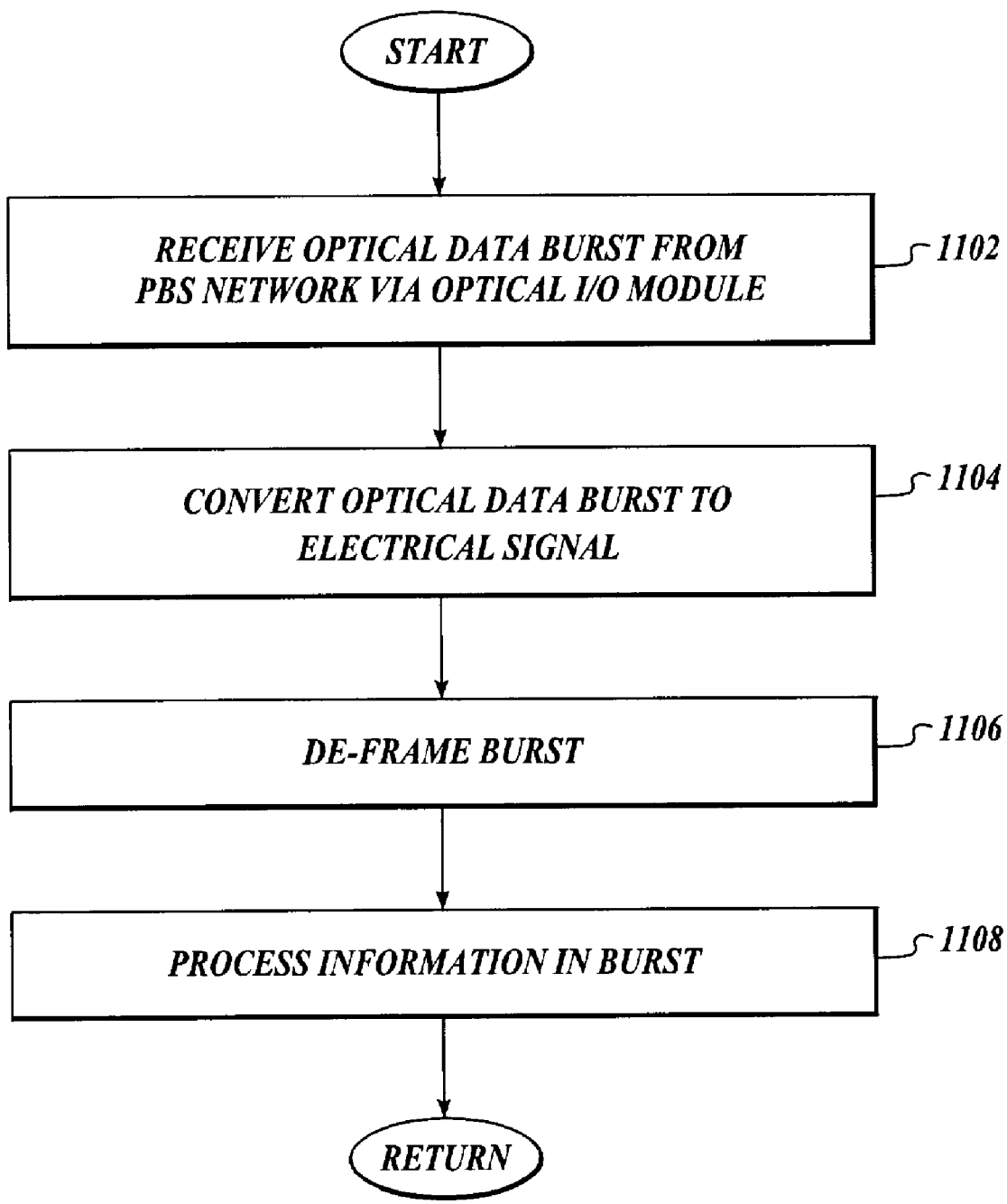
FIG. 11 is a flow diagram illustrating an egress operational flow directly to a server module, according to one embodiment of the present invention.

Referring to FIGS. 9 and 11, in operation, server module $75_1$ can receive information from the PBS network as follows. Server module $75_1$ receives an optical data burst from the PBS network via optical I/O module 71 (FIG. 7). In this embodiment, server module $75_1$ receives the optical data burst via optical interconnect 881 and port $76_1$. In this embodiment, server module $75_1$ does not receive an optical PBS control burst because optical I/O module 71 serves as the terminus of the PBS network; therefore, server module $75_1$ does not have an optical PBS switch that needs to be configured. This operational flow is represented by a block 1102.

Server module $75_1$ converts the received optical PBS data burst into electrical signals. In this embodiment, O-E interface 916 receives the optical PBS data burst via optical interconnect 950 and then performs the O-E conversion. This operational flow is represented by a block 1104.

The received O-E converted PBS data burst is then de-framed. In this embodiment, framer unit 908 receives the O-E converted PBS data burst from O-E interface 916 via interconnect 952 and de-frames the PBS data burst. For example, in one embodiment, the PBS data burst may be framed as described in aforementioned U.S. patent application Ser. No. 10/377,580. In other embodiments, a different framing format may be used. This operational flow is represented by a block 1106.

The information included in the PBS data burst is then processed. In this embodiment, network processor unit 902 receives the de-framed PBS data burst from framer unit 908 via interconnect 954 and performs the processing. For example, in some embodiments, network processor unit 902 can extract address and payload information, perform error correction on header and/or payload information, concatenate a payload, re-assemble segmented payloads, etc. In one embodiment, egress network processor 1062 (FIG. 10) processes the de-framed burst. In addition, CPU 904 can perform further processing of the address and payload information, which it can receive from network processor unit 902 via electrical interconnect 956. This operational flow is represented by a block 1108.

Figure 12:
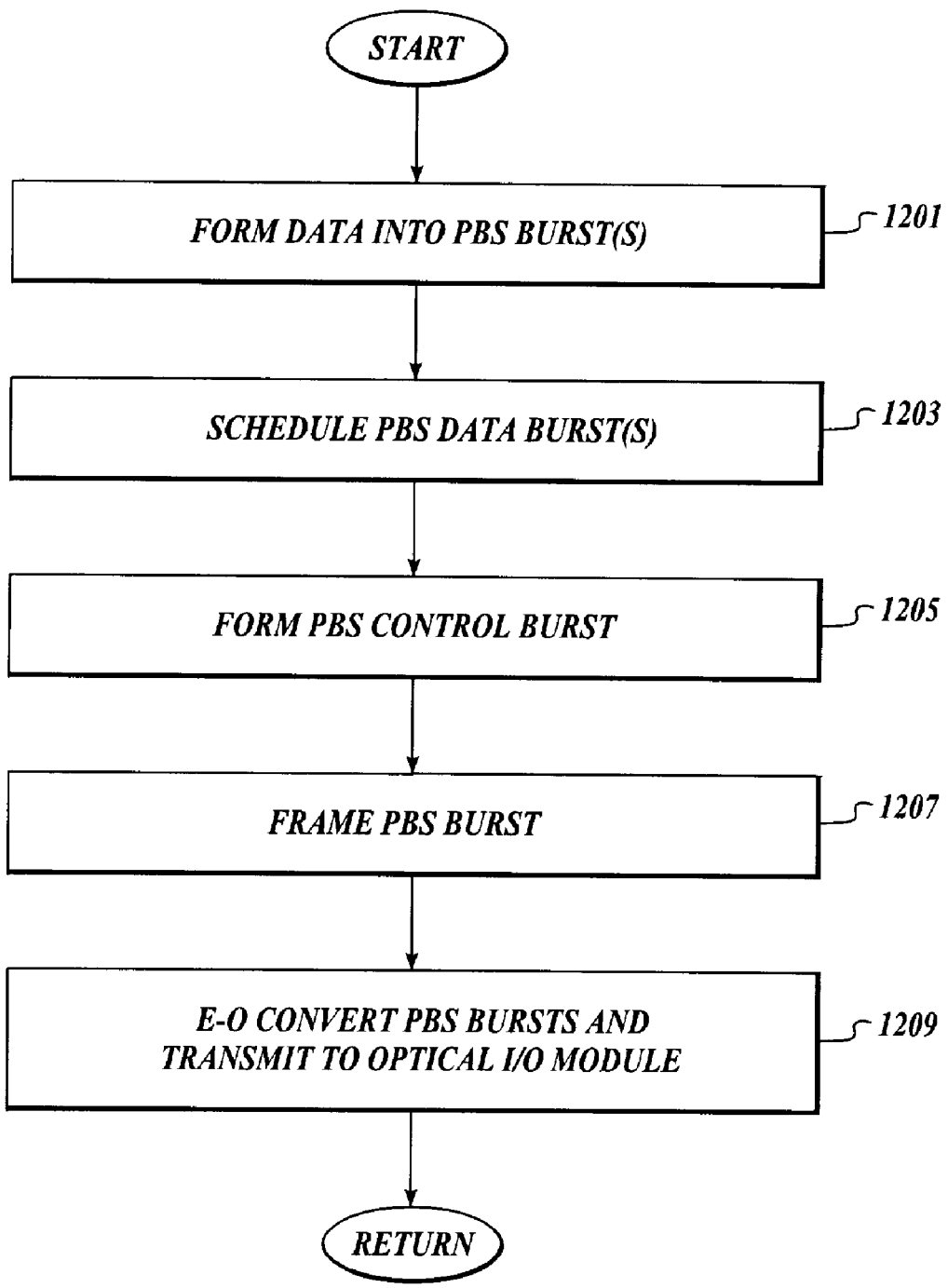
FIG. 12 is a flow diagram illustrating an ingress operational flow directly from a server module, according to one embodiment of the present invention.

Referring to FIGS. 9 and 12, in operation, server module 75₁ can perform PBS ingress operations; i.e., transferring information to the PBS network as follows. Server module 75₁ forms data to be transmitted over the PBS network into PBS data bursts. In this embodiment, network processor unit 902 processes the data to form PBS data burst(s) as described above for ingress nodes in PBS network 10 (FIG. 1). In other embodiments, the information is assembled into any suitable aggregated format to be transmitted over an optical burst network (not necessarily a PBS network). In one embodiment, ingress network processor 1060 (FIG. 10) processes the data. Further, in this embodiment, network processor unit 902 uses queue unit 906 to store data bursts as they are being formed and until they are scheduled for transmission over the PBS network. This operational flow is represented by a block 1201.

The PBS data burst(s) are then scheduled for transmission over the PBS network. In one embodiment, network processor unit 902 reserves available bandwidth (e.g., variable TDM channel) for transmission of the PBS data burst(s) as previously described for ingress nodes in PBS network 10 (FIG. 1). The PBS data burst(s) can then be scheduled for transmission in the reserved bandwidth. This operation flow is represented by a block 1203.

A PBS control burst corresponding to the PBS data burst(s) is then formed. In one embodiment, network processor unit 902 forms the PBS control burst corresponding to the data burst(s) as previously described for ingress nodes in PBS network 10. As previously described, the PBS control burst contains control information for the associated PBS data burst(s). The operational flow is represented by a block 1205.

The bursts are then encapsulated into frames for transmission over the PBS network. In this embodiment, framer unit 908 receives the bursts from queue unit 906 via interconnect 944 and performs the framing operation. In one embodiment, the bursts are framed as described in aforementioned U.S. patent application Ser. No. 10/377,580. In other embodiments, different framing formats can be used. This operational flow is represented by a block 1207.

The framed bursts are then converted to optical signals and transmitted over the PBS network at the scheduled times. In this embodiment, E-O interface 910 receives the framed bursts (i.e., PBS control and data bursts) from framer unit 908 via interconnect 946. E-O interface 910 then performs the E-O conversion and transmits the optical signals at the scheduled time and in the reserved PBS TDM channel of the PBS network to optical I/O module 71 via optical interconnect 881. This operational flow is represented by block 1209.

Embodiments of method and apparatus for implementing a photonic burst switched network are described herein. In the above description, numerous specific details are set forth to provide a thorough understanding of embodiments of the invention. One skilled in the relevant art will recognize, however, that embodiments of the invention can be practiced without one or more of the specific details, or with other methods, components, materials, etc. In other instances, well-known structures, materials, or operations are not shown or described in detail to avoid obscuring this description.

Reference throughout this specification to "one embodiment" or "an embodiment" means that a particular feature, structure, or characteristic described in connection with the embodiment is included in at least one embodiment of the present invention. Thus, the appearances of the phrases "in one embodiment" or "in an embodiment" in various places throughout this specification are not necessarily all referring to the same embodiment. Furthermore, the particular features, structures, or characteristics may be combined in any suitable optical manner in one or more embodiments.

Thus, embodiments of this invention may be used as or to support software program executed upon some form of processing core (such as the CPU of a computer or a processor of a module) or otherwise implemented or realized upon or within a machine-readable medium. A machine-readable medium includes any mechanism for storing or transmitting information in a form readable by a machine (e.g., a computer). For example, a machine-readable medium can include such as a read only memory (ROM); a random access memory (RAM); a magnetic disk storage media; an optical storage media; and a flash memory device, etc. In addition, a machine-readable medium can include propagated signals such as electrical, optical, acoustical or other form of propagated signals (e.g., carrier waves, infrared signals, digital signals, etc.).

In the foregoing specification, embodiments of the invention have been described. It will, however, be evident that various modifications and changes may be made thereto without departing from the broader spirit and scope as set forth in the appended claims. The specification and drawings are, accordingly, to be regarded in an illustrative rather than a restrictive sense.

What is claimed is:

1. A system comprising:
   a backplane including a switching fabric with wired communication channel, the wired communication channel to provide a medium to propagate information;
   a configuration unit module coupled to the wired communication channel, wherein the configuration unit module includes an optical port; and
   an optical input/output (I/O) module coupled to the wired communication channel, the optical I/O module including an optical network port to be coupled to an optical network and including another optical port coupled to the optical port of the configuration unit module via an optical interconnect, the optical I/O module to selectively transmit an optical burst over the optical network in response to receiving the optical burst from the configuration unit module via the optical interconnect.

2. The system of claim 1 wherein the configuration unit module is one of a plurality of configuration unit modules coupled to the wired communication channel, the optical I/O module having a plurality of optical ports coupled to optical ports of the plurality of configuration unit modules.

3. The system of claim 2 further comprising a legacy interface module coupled to the wired communication channel, the legacy interface module including a port to be coupled to a legacy network.

4. The system of claim 2 wherein the optical network is a photonic burst switched network.

5. The system of claim 2 wherein a configuration unit module of the plurality of configuration unit modules comprises:
a central processing unit (CPU);
a network processor unit coupled to the CPU, wherein the network processor unit is to aggregate information received from the CPU into a burst;
a framer unit coupled to the network processor unit, wherein the framer is to encapsulate the burst into an optical network frame; and
an optical output interface coupled to the framer unit and the optical network, the optical output interface to transmit an optical signal including the optical network frame to the optical I/O module.

6. The system of claim 5 wherein the network processor is to aggregate information using statistical multiplexing.

7. The system of claim 5 further comprising a queue unit coupled to the framer unit and the network processing unit, wherein the queue unit is to store bursts until they are scheduled to be transmitted over the optical network.

8. The system of claim 5 wherein the network processor unit is to form a first burst and a second burst, wherein first burst includes information for routing the second burst through the optical network.

9. The system of claim 2 wherein the optical I/O module further comprises:
a multiplexer unit coupled to the optical network port of the optical I/O module;
a $N_S \times M$ optical switch coupled to the plurality of configuration unit modules and coupled to the optical network, wherein $N_S$ is equal to the number of configuration unit modules in the plurality of configuration unit modules and M is an integer greater than or equal to one;
a control unit coupled to the optical switch and the multiplexer unit, wherein the control unit is to configure the optical switch in response to a control burst received from a configuration module of the plurality of configuration modules.

10. The system of claim 9 wherein the control unit is to receive the control burst via the backplane.

11. The system of claim 9 wherein the control unit is also to configure the optical switch in response to a control burst received from a client via the optical network.

12. The system of claim 2 wherein the plurality of configuration unit modules includes a server module including a server.

13. The system of claim 12 wherein the server module includes a plurality of servers.

14. The system of claim 2 wherein the backplane comprises a plurality of interconnected switching fabrics.

15. The system of claim 2 wherein the plurality of configuration unit modules is reconfigurable.

16. A method comprising:
forming information in a configuration unit module into an electrical data burst, the configuration unit module being part of a unit serving as a node of an optical network, the unit including a backplane coupled to the configuration unit module, the backplane including a wired communication channel to carry signals within the unit;
forming, in the configuration unit module, an electrical control burst including control information associated with the electrical data burst;
converting the electrical control burst into an optical control burst;
transmitting the optical control burst from the configuration unit module to an optical input/output (I/O) module of the unit, the optical I/O module being responsive to the optical control burst in configuring an optical switch in the optical I/O module; and
optically transmitting an optical data burst associated with the optical control burst from the configuration unit module to the optical I/O module, the optical I/O module to optically switch the optical data burst to another node of the optical network.

17. The method of claim 16 wherein the configuration unit module is one of a plurality of configuration unit modules coupled to the backplane.

18. The method of claim 17 wherein converting the electrical control burst comprises converting the electrical control burst into a photonic burst switched (PBS) control burst for transmission to a PBS network.

19. The method of claim 17 wherein the plurality of configuration unit modules includes a server module including a server.

20. The method of claim 19 wherein the server module includes a plurality of servers.

21. The method of claim 17 wherein optically transmitting the optical data burst comprises transmitting the optical data burst at an optical wavelength different from that of the optical control burst.

22. The method of claim 17 wherein optically transmitting the optical data burst comprises transmitting the optical data burst at an optical wavelength that is the same as that of the optical control burst.

23. The method of claim 17 wherein the backplane comprises a plurality of interconnected switching fabrics.

24. The method of claim 17 wherein the plurality of configuration unit modules is reconfigurable.

25. A system comprising:
a first network; and
a wavelength division multiplexed (WDM) optical network coupled to the first network, the WDM optical network further comprising an edge node that comprises:
a backplane comprising a switching fabric to propagate information,
a plurality of configuration unit modules coupled to the switching fabric, wherein each configuration unit module includes an optical port, and
an optical input/output (I/O) module coupled to the switching fabric, the optical I/O module including an optical network port to be coupled to another node of the WDM optical network and including a plurality of optical ports coupled to the optical ports of the plurality of configuration unit modules via a plurality of optical interconnects, the optical I/O module to selectively transmit an optical burst over the WDM optical network in response to receiving the optical burst received from a configuration unit module of the plurality of configuration unit modules.

26. The system of claim 25 wherein the WDM optical network comprises a photonic burst switched network.

27. The system of claim 26 wherein the backplane comprises a plurality of interconnected switching fabrics.

28. The system of claim 26 wherein the plurality of configuration unit modules is reconfigurable.

29. The system of claim 25 a configuration unit module of the plurality of configuration unit modules comprises:
  a central processing unit (CPU);
  a network processor unit coupled to the CPU, wherein the network processor unit is to aggregate information received from the CPU into a burst;
  a framer unit coupled to the network processor unit, wherein the framer is to encapsulate the burst into a WDM optical network frame; and
  an optical output interface coupled to the framer unit and the WDM optical network, the optical output interface to transmit an optical signal including the WDM optical network frame to the optical I/O module.

30. The system of claim 29 wherein the network processor is to aggregate information using statistical multiplexing.

31. The system of claim 29 further comprising a queue unit coupled to the framer unit and the network processing unit, wherein the queue unit is to store bursts until they are scheduled to be transmitted over the WDM optical network.

32. The system of claim 29 wherein the network processor unit is to form a first burst and a second burst, wherein first burst includes information for routing the second burst through the WDM optical network.

33. The system of claim 25 wherein the optical I/O module further comprises:
  a multiplexer unit coupled to the optical network port of the optical I/O module;
  a $N_S \times M$ optical switch coupled to the plurality of configuration unit modules and coupled to the optical network via the multiplexer unit, wherein $N_S$ is equal to the number of configuration unit modules in the plurality of configuration unit modules and M is an integer greater than or equal to one;
  a control unit coupled to the $N_S \times M$ optical switch and the multiplexer unit, wherein the control unit is to configure the $N_S \times M$ optical switch in response to a control burst received from a configuration module of the plurality of configuration modules.

34. The system of claim 33 wherein the control unit is to receive the control burst via the switching fabric of the backplane.

35. The system of claim 33 wherein the control unit is also to configure the $N_S \times M$ optical switch in response to an optical control burst received from a client via the WDM optical network.

36. The system of claim 25 wherein the plurality of configuration unit modules includes a server module including a server.

37. The system of claim 36 wherein the server module includes a plurality of servers.

38. A method, comprising:
  converting a first optical burst signal into an electrical burst signal, wherein the first optical burst signal is received from a node of an optical network, the node including an optical I/O module and a plurality of configuration unit modules connected to a backplane that includes a switching fabric with a wired communication channel, the plurality of configuration unit modules also being connected to the optical I/O module via a plurality of optical interconnects;
  processing the electrical burst signal to obtain control information to configure an optical switch of the optical I/O module; and
  optically switching a second optical burst signal received from the optical network to a configuration unit module of the plurality of configuration unit modules via the configured optical switch, the plurality of configuration unit modules each including an optical interface.

39. The method of claim 38 wherein converting a first optical burst signal into an electrical burst signal comprises receiving a control burst from a photonic burst switched (PBS) network.

40. The method of claim 38 wherein the plurality of configuration unit modules includes a server module including a server.

41. The method of claim 40 wherein the server module includes a plurality of servers.

42. The method of claim 38 further comprising converting the second optical burst signal into an electrical burst in the configuration unit module.

43. The method of claim 38 wherein the backplane comprises a plurality of interconnected switching fabrics.

44. The method of claim 38 wherein the plurality of configuration unit modules is reconfigurable.

45. A system comprising:
  a backplane including a switching fabric with a wired communication channel, the wired communication channel to provide a medium to propagate information;
  a plurality of configuration unit modules coupled to the wired communication channel, wherein each configuration unit module includes an optical port; and
  an optical input/output (I/O) module coupled to the wired communication channel, the optical I/O module including an optical network port to be coupled to an optical network and including a plurality of optical ports coupled to the optical ports of the plurality of configuration unit modules via a plurality of optical interconnects, the optical I/O module to receive an optical burst from the optical network and optically switch the received optical burst to a configuration unit module of the plurality of configuration unit.

46. The system of claim 45 further comprising a legacy interface module coupled to the wired communication channel, the legacy interface module including a port to be coupled to a legacy network.

47. The system of claim 45 wherein the optical network is a photonic burst switched network.

48. The system of claim 45 wherein a configuration unit module of the plurality of configuration unit modules comprises:
  a central processing unit (CPU);
  a network processor unit coupled to the CPU, wherein the network processor unit is to statistically multiplex information received from the CPU into a burst;
  a framer unit coupled to the network processor unit, wherein the framer is to encapsulate the burst into an optical network frame; and
  an optical output interface coupled to the framer unit and the optical network, the optical output interface to transmit an optical signal including the optical network frame to the optical I/O module.

49. The system of claim 48 wherein the network processor is to aggregate information using statistical multiplexing.

50. The system of claim 48 further comprising a queue unit coupled to the framer unit and the network processing unit, wherein the queue unit is to store bursts until they are scheduled to be transmitted over the optical network.

51. The system of claim 45 wherein the optical I/O module further comprises:
  a multiplexer unit coupled to the optical network port of the optical I/O module;
  a $N_S \times M$ optical switch coupled to the plurality of configuration unit modules and coupled to the optical network via the multiplexer unit, wherein $N_S$ is equal to the number of configuration unit modules in the plurality of configuration unit modules and M is an integer greater than or equal to one;

a control unit coupled to the optical switch and the multiplexer unit, the control unit to configure the $N_S \times M$ optical switch in response to a control burst received from a configuration unit module of the plurality of configuration unit modules.

52. The system of claim 51 wherein the control unit is to receive the control burst via the backplane.

53. The system of claim 51 wherein the optical I/O module is to receive an optical burst from a configuration unit module of the plurality of configuration unit modules and to optically switch the optical burst to another node of the optical network via the $N_S \times M$ optical switch.

54. The system of claim 53 wherein the control unit is also to configure the $N_S \times M$ optical switch in response to a control burst received from a client via the optical network.

55. The system of claim 45 wherein the plurality of configuration unit modules includes a server module including a server.

56. The system of claim 55 wherein the server module includes a plurality of servers.

57. The system of claim 45 wherein the backplane comprises a plurality of interconnected switching fabrics.

58. The system of claim 45 wherein the plurality of configuration unit modules are reconfigurable.

59. A system comprising:

a first network; and a wavelength division multiplexed (WDM) optical network coupled to the first network, the WDM optical network further comprising an edge node that includes;

a backplane including a switching fabric to provide a medium to propagate information;

a plurality of configuration unit modules coupled to the wired communication channel, wherein each configuration unit module includes an optical port; and an optical input/output (I/O) module coupled to the switching fabric, the optical I/O module including an optical network port to be coupled to another node of the WDM optical network and including a plurality of optical ports coupled to the optical ports of the plurality of configuration unit modules via a plurality of optical interconnects, the optical I/O module to selectively optically switch an optical burst to a configuration unit module of the plurality of configuration units in response to receiving the optical burst from the WDM optical network.

60. The system of claim 59 further comprising a legacy interface module coupled to the switching fabric, the legacy interface module including a port to be coupled to the first network.

61. The system of claim 59 wherein the WDM optical network is a photonic burst switched network.

62. The system of claim 59 wherein a configuration unit module of the plurality of configuration unit modules comprises:

a central processing unit (CPU);

a network processor unit coupled to the CPU, wherein the network processor unit is to aggregate information received from the CPU into a burst;

a framer unit coupled to the network processor unit, wherein the framer is to encapsulate the burst into a WDM optical network frame; and an optical output interface coupled to the framer unit and the WDM optical network, the optical output interface to transmit an optical signal including the WDM optical network frame to the optical I/O module.

63. The system of claim 62 further comprising a queue unit coupled to the framer unit and the network processing unit, wherein the queue unit is to store bursts until they are scheduled to be transmitted over the WDM optical network.

64. The system of claim 62 wherein the network processor is to aggregate information using statistical multiplexing.

65. The system of claim 59 wherein the optical I/O module further comprises:

a multiplexer unit coupled to the optical network port;

a $N_S \times M$ optical switch coupled to the plurality of configuration unit modules and coupled to the optical network via the multiplexer unit, wherein $N_S$ is equal to the number of configuration unit modules in the plurality of configuration unit modules and M is an integer greater than or equal to one;

a control unit coupled to the optical switch and the multiplexer unit, wherein the control unit is to configure the $N_S \times M$ optical switch in response to a control burst received from a service module of the plurality of service modules.

66. The system of claim 65 wherein the control unit is to receive the control burst via the backplane.

67. The system of claim 65 wherein the optical I/O module is to receive an optical burst from a configuration unit module of the plurality of configuration unit modules and to optically switch the optical burst to another node of the WDM optical network via the $N_S \times M$ optical switch.

68. The system of claim 67 wherein the control unit is also to configure the $N_S \times M$ optical switch in response to a control burst received from a client via the WDM optical network.

69. The system of claim 59 wherein the plurality of configuration unit modules includes a server module including a server.

70. The system of claim 69 wherein the server module includes a plurality of servers.

71. The system of claim 59 wherein the backplane comprises a plurality of interconnected switching fabrics.

72. The system of claim 59 wherein the plurality of configuration unit modules are reconfigurable.

* * * * *